US009235103B2

(12) United States Patent
Liu et al.

(10) Patent No.: US 9,235,103 B2
(45) Date of Patent: Jan. 12, 2016

(54) 3D LIQUID CRYSTAL DISPLAY COMPRISING FOUR ELECTRODES ALTERNATELY ARRANGE BETWEEN A FIRST AND SECOND SUBSTRATE

(71) Applicant: AU Optronics Corporation, Hsinchu (TW)

(72) Inventors: Sheng-Chi Liu, Hsinchu (TW); Yung-Sheng Tsai, Hsinchu (TW); Jen-Lang Tung, Hsinchu (TW)

(73) Assignee: AU OPTRONICS CORPORATION, Hsinchu (TW)

( * ) Notice: Subject to any disclaimer, the term of this patent is extended or adjusted under 35 U.S.C. 154(b) by 427 days.

(21) Appl. No.: 13/660,569

(22) Filed: Oct. 25, 2012

(65) Prior Publication Data

US 2014/0118644 A1 May 1, 2014

(51) Int. Cl.
| | |
|---|---|
| *G02F 1/1335* | (2006.01) |
| *G02F 1/29* | (2006.01) |
| *G02B 27/22* | (2006.01) |
| G02B 27/42 | (2006.01) |
| G02B 5/18 | (2006.01) |
| G02B 27/00 | (2006.01) |
| G02F 1/1343 | (2006.01) |
| G02B 3/00 | (2006.01) |

(52) U.S. Cl.
CPC .............. *G02F 1/29* (2013.01); *G02B 27/2214* (2013.01); *G02B 3/0056* (2013.01); *G02B 3/0075* (2013.01); *G02B 5/1876* (2013.01); *G02B 27/0037* (2013.01); *G02B 27/4205* (2013.01); *G02F 1/133526* (2013.01); *G02F 1/134336* (2013.01); *G02F 1/292* (2013.01); *G02F 2001/294* (2013.01)

(58) Field of Classification Search
CPC .............. G02B 5/1876; G02B 27/0037; G02F 1/133526; G02F 1/292
See application file for complete search history.

(56) References Cited

U.S. PATENT DOCUMENTS

| | | | | |
|---|---|---|---|---|
| 8,605,227 | B2 * | 12/2013 | Yoon ...................... | G09G 3/003 349/15 |
| 2003/0098945 | A1 | 5/2003 | Sugimoto et al. | |
| 2006/0209295 | A1 | 9/2006 | Sugimoto et al. | |
| 2011/0102689 | A1 * | 5/2011 | Chiu .................. | G02B 27/2214 349/15 |
| 2011/0157171 | A1 | 6/2011 | Lin | |
| 2011/0157497 | A1 | 6/2011 | Kim | |

FOREIGN PATENT DOCUMENTS

TW     201107789 A     3/2011

* cited by examiner

*Primary Examiner* — Paul Lee
*Assistant Examiner* — Agnes Dobrowolski
(74) *Attorney, Agent, or Firm* — Tim Tingkang Xia, Esq.; Locke Lord LLP

(57) ABSTRACT

A liquid crystal (LC) lens includes first and second substrates, an LC layer disposed therebetween, and a plurality of first and second electrode structures. Each electrode structure has a plurality of first, second, third and fourth electrodes spaced-apart and alternately arranged along a first direction, where the first and second electrodes are disposed between the first substrate and the LC layer, while the third and fourth electrodes are disposed between the second substrate and the LC layer. In each first electrode structure, each of the first and second electrodes and a corresponding one of the third and fourth electrodes are aligned at a left tilted angle, while in each second electrode structure, each of the first and second electrodes and a corresponding one of the third and fourth electrodes are aligned at a right tilted angle. The first and second electrode structures are alternately arranged along a second direction.

24 Claims, 17 Drawing Sheets

(A)

(B)

1600

(A)

(B)

3D LIQUID CRYSTAL DISPLAY COMPRISING FOUR ELECTRODES ALTERNATELY ARRANGE BETWEEN A FIRST AND SECOND SUBSTRATE

FIELD OF THE INVENTION

The disclosure relates generally to stereoscopic display, and more particularly to liquid crystal lens structures and applications of the same.

BACKGROUND OF THE INVENTION

A liquid crystal (LC) lens is an optic assembly which focuses or diverges light utilizing a birefringent characteristic of LC molecules and a characteristic of changing arrangement of the LC molecules with electric-field distribution. The LC lens can change aligning directions of the LC molecules via changing an operating voltage, so as to achieve an effect of changing focus. Such an LC lens operably has a gradient refractive index, and has been widely used in three-dimensional (3D) image display as a 2D/3D switching device.

A traditional LC lens gives rise to disclination lines of the LC distribution over the slit electrodes of the LC lens, which results in the LC refractive index distribution departing from the ideal lens curvature. Particularly, for oblique incidence of light, the traditional LC lens loses the parabolic profile of the refractive index. Additionally, the disclination lines of the LC distribution also cause the LC refractive index distribution to be discontinuous.

Therefore, a heretofore unaddressed need exists in the art to address the aforementioned deficiencies and inadequacies.

SUMMARY OF THE INVENTION

In one aspect, the invention relates to an LC lens. In one embodiment, the LC lens includes a first substrate and a second substrate spaced apart from each other, a liquid crystal layer disposed between the first substrate and the second substrate, a plurality of first electrode structures, and a plurality of first electrode structures.

Each first electrode structure comprises a plurality of first electrodes, a plurality of second electrodes, a plurality of third electrodes and a plurality of fourth electrodes. The plurality of first electrodes and the plurality of second electrodes are disposed between the first substrate and the liquid crystal layer and spaced-apart and alternately arranged along a first transversal direction, while the plurality of third electrodes and the plurality of fourth electrodes are disposed between the second substrate and the liquid crystal layer and spaced-apart and alternately arranged along the first transversal direction, such that each of the first electrodes and the second electrodes and a corresponding one of the third electrodes and the fourth electrodes of each first electrode structure are aligned at a left tilted angle, $\theta_1$.

Each second electrode structure comprises a plurality of first electrodes, a plurality of second electrodes, a plurality of third electrodes and a plurality of fourth electrodes. The plurality of first electrodes and the plurality of second electrodes are disposed between the first substrate and the liquid crystal layer and spaced-apart and alternately arranged along the first transversal direction, while the plurality of third electrodes and the plurality of fourth electrodes are disposed between the second substrate and the liquid crystal layer and spaced-apart and alternately arranged along the first transversal direction, such that each of the first electrodes and the second electrodes and a corresponding one of the third electrodes and the fourth electrodes of each second electrode structure are aligned at a right tilted angle, $\theta_2$.

The plurality of first electrode structures and the plurality of second electrode structures are alternately arranged along a second transversal direction.

In one embodiment, each two adjacent electrodes in each of the plurality of first electrode structures and the plurality of second electrode structures define a space therebetween.

In one embodiment, the plurality of first electrodes and the plurality of second electrodes of the plurality of first electrode structures and the plurality of second electrode structures define a first electrode matrix, and the plurality of third electrodes and the plurality of fourth electrodes of the plurality of first electrode structures and the plurality of second electrode structures define a second electrode matrix. Each row of the first electrode matrix and a corresponding row of the second electrode matrix form one of the plurality of first electrode structures and the plurality of second electrode structures. Each electrode in each row of the first electrode matrix is overlapped with the space defined between two corresponding adjacent electrodes in the corresponding row of the second electrode matrix, and vice versa.

In one embodiment, in the first electrode matrix, the first electrodes are arranged in the odd columns and the second electrodes are arranged in the even columns, and in the second electrode matrix, the third electrodes are arranged in the odd columns and the fourth electrodes are arranged in the even columns, or vice versa.

In one embodiment, in the first electrode matrix, the first electrodes and the second electrodes are alternately arranged in each column, and in the second electrode matrix, the third electrodes are arranged in the odd columns and the fourth electrodes are arranged in the even columns, or vice versa.

In one embodiment, in the first electrode matrix, the first electrodes and the second electrodes are alternately arranged in each column, and in the second electrode matrix, the third electrodes and the fourth electrodes are alternately arranged in each column.

In one embodiment, each column of the first electrode matrix is aligned with a corresponding column of the second electrode matrix, and wherein each column of the first and second electrode matrixes has a first sub-column and a second sub-column displaced from the first sub-column, such that the first and second sub-columns of each column of the first electrode matrix are respectively aligned with the first and second sub-columns of the corresponding column of the second electrode matrix.

In one embodiment, in one of the first and second electrode matrixes, the first sub-column of each column has electrodes in the odd rows and no electrode in the even rows, and the second sub-column of each column has electrodes in the even rows and no electrode in the odd rows, and in the other of the first and second electrode matrix, the first sub-column of each electrode column has electrodes in the even rows and no electrode in the odd rows, and the second sub-column of each column has electrodes in the odd rows and no electrode in the even rows.

In one embodiment, each electrode of the first and second electrode matrixes has a central portion and two side portions oppositely extending from the central portion along the transversal direction, and wherein the central portion and the two side portions of each electrode in each row of the first electrode matrix are respectively overlapped with the space and the two corresponding adjacent electrodes in the corresponding row of the second electrode matrix, and vice versa.

In one embodiment, the plurality of first electrodes of the first electrode matrix is electrically coupled to each other, the plurality of second electrodes of the first electrode matrix is electrically coupled to each other, the plurality of third electrodes of the second electrode matrix is electrically coupled to each other, and the plurality of fourth electrodes of the second electrode matrix is electrically coupled to each other.

In operation, a first voltage is applied to the plurality of first electrodes of the first electrode matrix, a second voltage is applied to the plurality of second electrodes of the first electrode matrix, a third voltage is applied to the plurality of third electrodes of the second electrode matrix, and a fourth voltage is applied to the plurality of fourth electrodes of the second electrode matrix. The first voltage is the same as one of the third and fourth voltages, and the second voltage is same as the other of the third and fourth voltages. In one embodiment, the third and fourth voltages are zero. In another embodiment, substantially different from one another. Each of the first, second, third and further voltages is a DC voltage or an AC voltage.

In one embodiment, each electrode of the first electrode structures and the second electrode structures has a geometric shape of rectangle, square, circle, diamond, or polygon. Each electrode of the first electrode structures and the second electrode structures is formed of a transparent conductive material.

In one embodiment, the first substrate and the second substrate have a long edge, and wherein the first transversal direction is in parallel with the long edge or in an inclined angle with the long edge.

Further, the liquid crystal lens may also include a first alignment layer disposed between the liquid crystal layer and the plurality of first electrodes and the plurality of second electrodes of the plurality of first electrode structures and the plurality of second electrode structures, the first substrate, and a second alignment layer disposed between the liquid crystal layer and the plurality of third electrodes and the plurality of fourth electrodes of the plurality of first electrode structures and the plurality of second electrode structures, the second substrate.

In another aspect, the present invention relates to a display device operably switchable between a two-dimensional (2D) display mode and a three-dimensional (3D) display mode. In one embodiment, the display device has a display panel, and the liquid crystal lens as disclosed above. The liquid crystal lens is disposed on the display panel.

The display panel includes a liquid crystal display panel, an organic light emitting display panel, an inorganic light emitting display panel, an electro-wetting display panel, a field emission display panel, or a plasma display panel.

The display panel further has a plurality of pixels arranged in an array. In one embodiment, the first electrode structures of the liquid crystal lens are disposed corresponding to odd rows of the pixel array and the second electrode structures of the liquid crystal lens are disposed corresponding to even rows of the pixel array, or vice versus.

The display device also has a power supply for respectively providing a first voltage to the first electrodes of the first electrode structures and the second electrode structures; a second voltage to the second electrodes of the first electrode structures and the first electrode structures; a third voltage to the third electrodes of the first electrode structures and the second electrode structure; and a fourth voltage to the fourth electrodes of the first electrode structures and the second electrode structure.

In one embodiment, the display device operates in the 2D display mode when the first, second, third and fourth voltages are zero.

In another embodiment, the display device operates in the 3D display mode when the first voltage is the same as one of the third and fourth voltages, and the second voltage is same as the other of the third and fourth voltages, where the third and fourth voltages are substantially different from one another.

In yet another aspect, the present invention relates to a method of driving the above-disclosed display device that is operably switchable between a 2D display mode and a 3D display mode.

The method comprises applying a first voltage to the first electrodes of the first electrode structures and the second electrode structures, a second voltage to the second electrodes of the first electrode structures and the second electrode structures, a third voltage to the third electrodes of the first electrode structures and the second electrode structure; and a fourth voltage to fourth electrodes of the first electrode structures and the second electrode structure, respectively.

In one embodiment, prior to the applying step, the method further comprises setting the first, second, third and fourth voltages to be zero, if the display device is set to operate in the 2D display mode.

In one embodiment, prior to the applying step, the method further detecting a location of a viewer; determining whether a viewer is in a first viewing zone and a second viewing zone, if the display device is set to operate in the 3D display mode; and adjusting the first and third voltages to be a predetermined voltage, and the second and fourth voltages to be zero, according to the location of the viewer.

In one embodiment, each of the first, second, third and further voltages is a DC voltage or an AC voltage.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
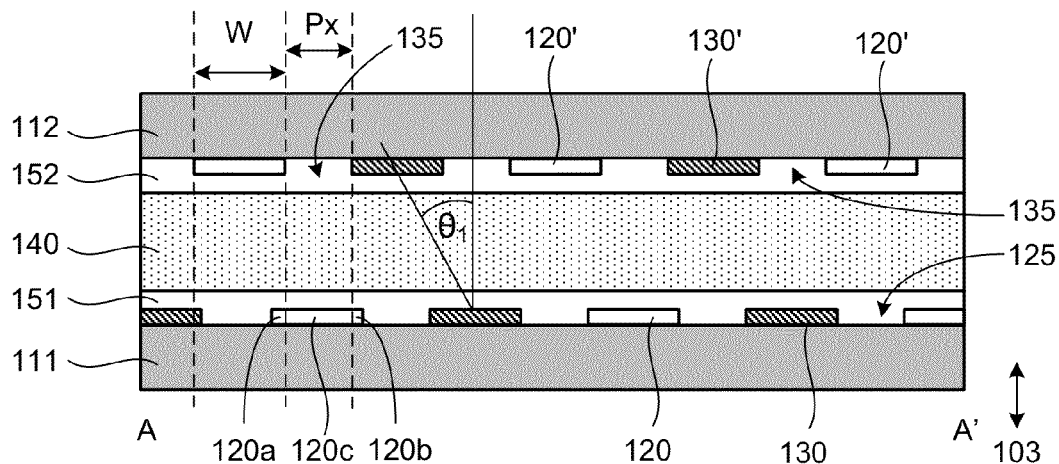
FIG. 1 shows schematically a liquid crystal (LC) lens according to one embodiment of the present invention, (A) a cross-sectional view of the LC lens along line A-A' and (B) a cross-sectional view of the LC lens along line B-B'.
Figure 1:
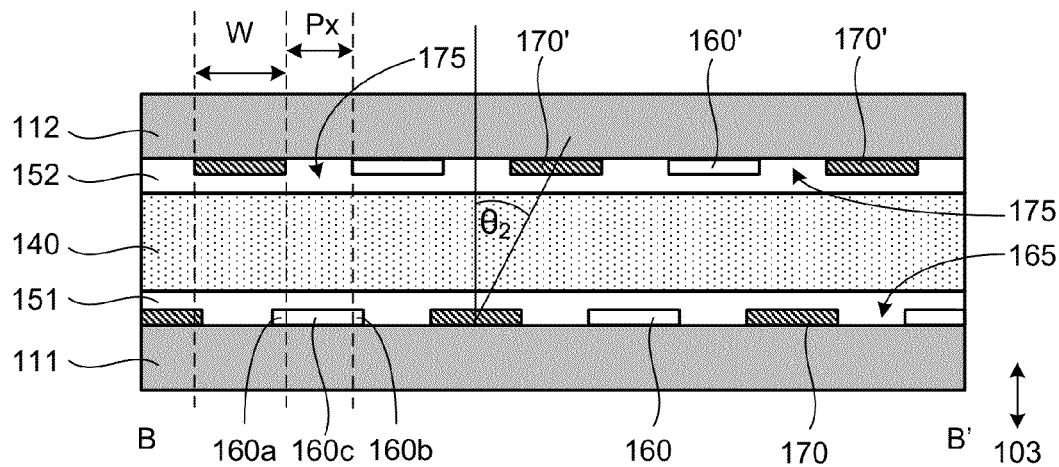
Figure 2:
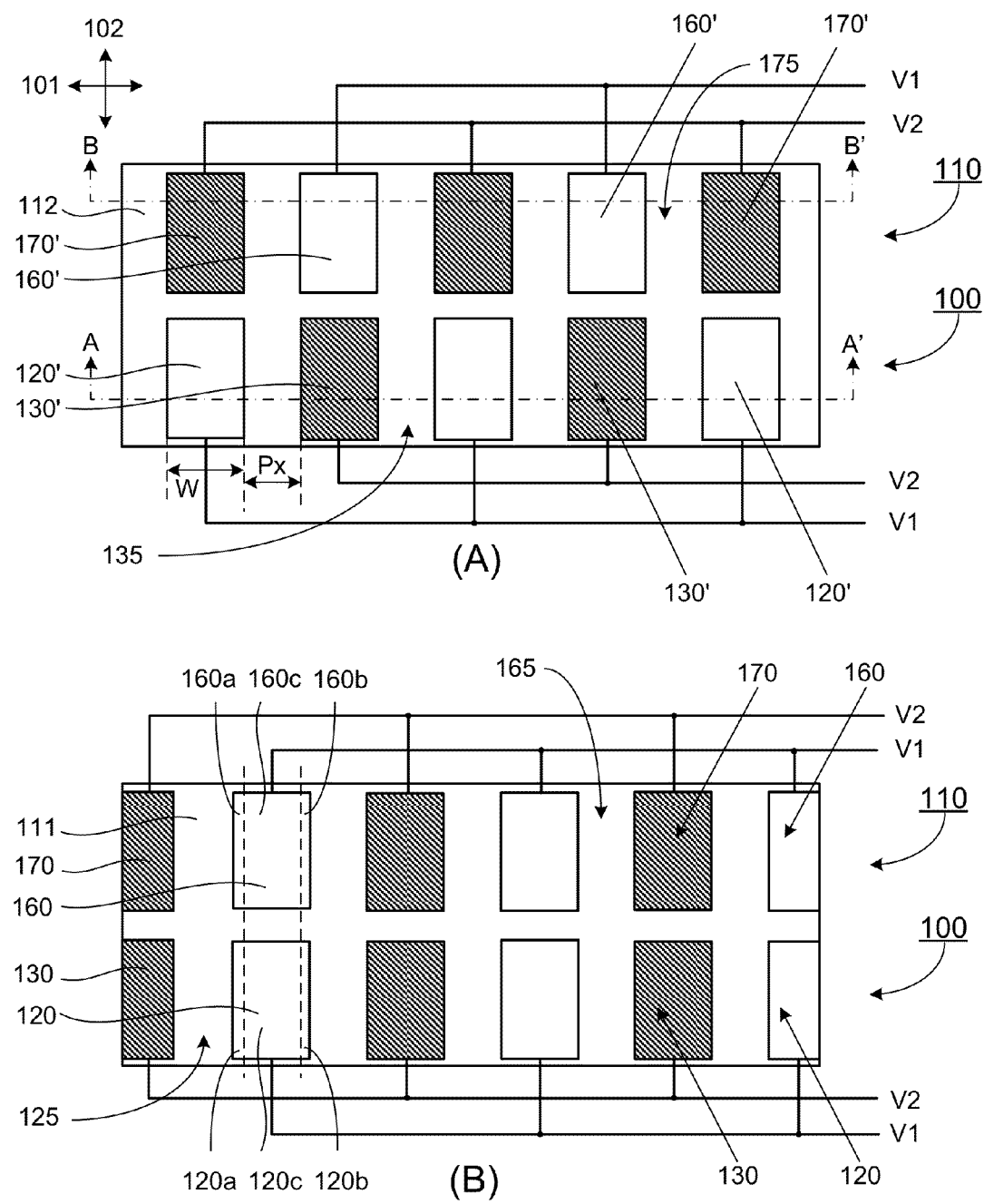
FIG. 2 shows schematically an LC lens according to one embodiment of the present invention, (A) a top view of the LC lens on the second substrate, and (B) a top view of the LC lens on the first substrate.
Figure 3:
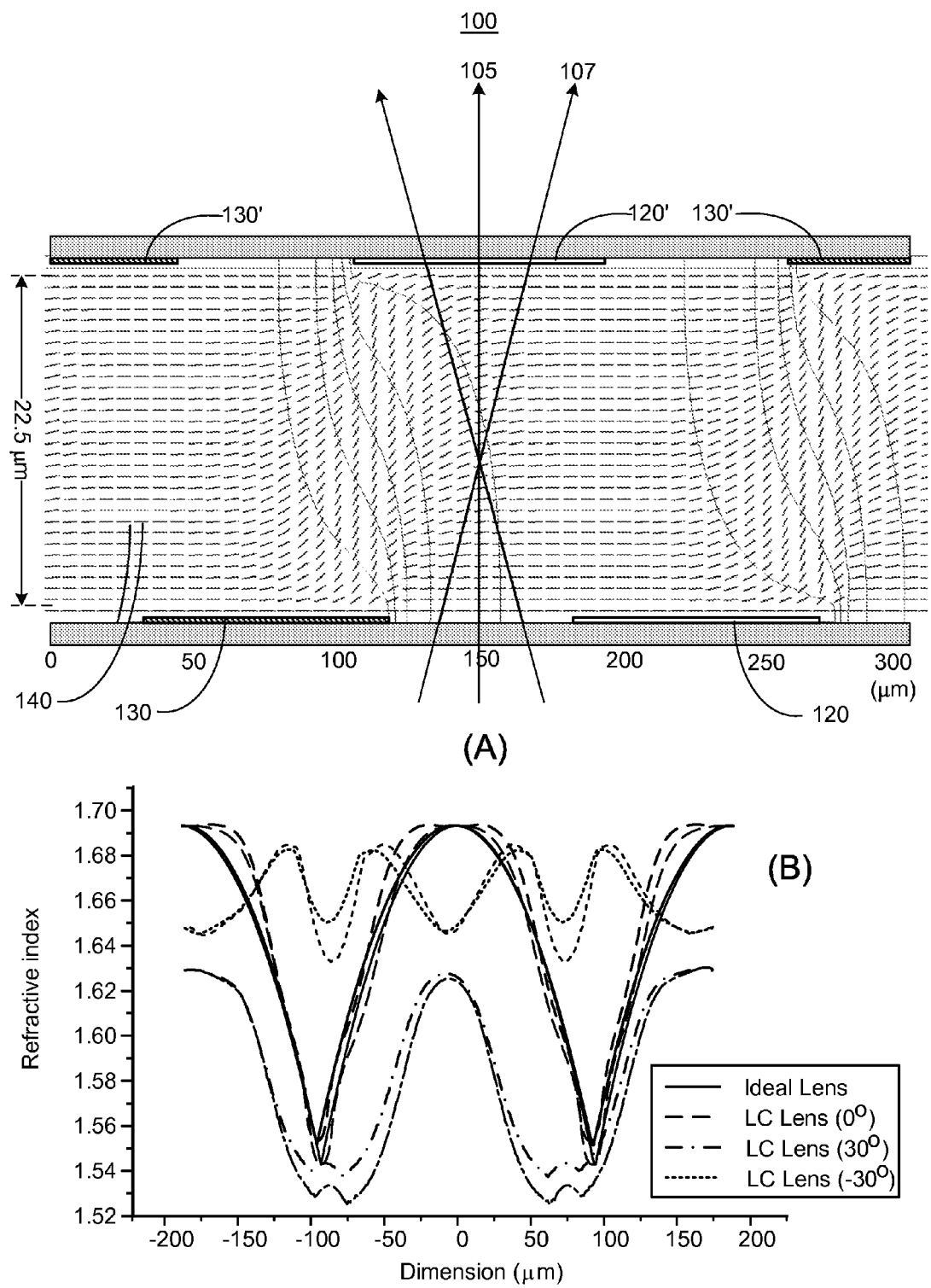
FIG. 3 shows simulation results of an LC lens according to one embodiment of the present invention, (A) LC alignments and electrical field distribution of the LC lens, and (B) refractive indices of the LC lens.
Figure 4:
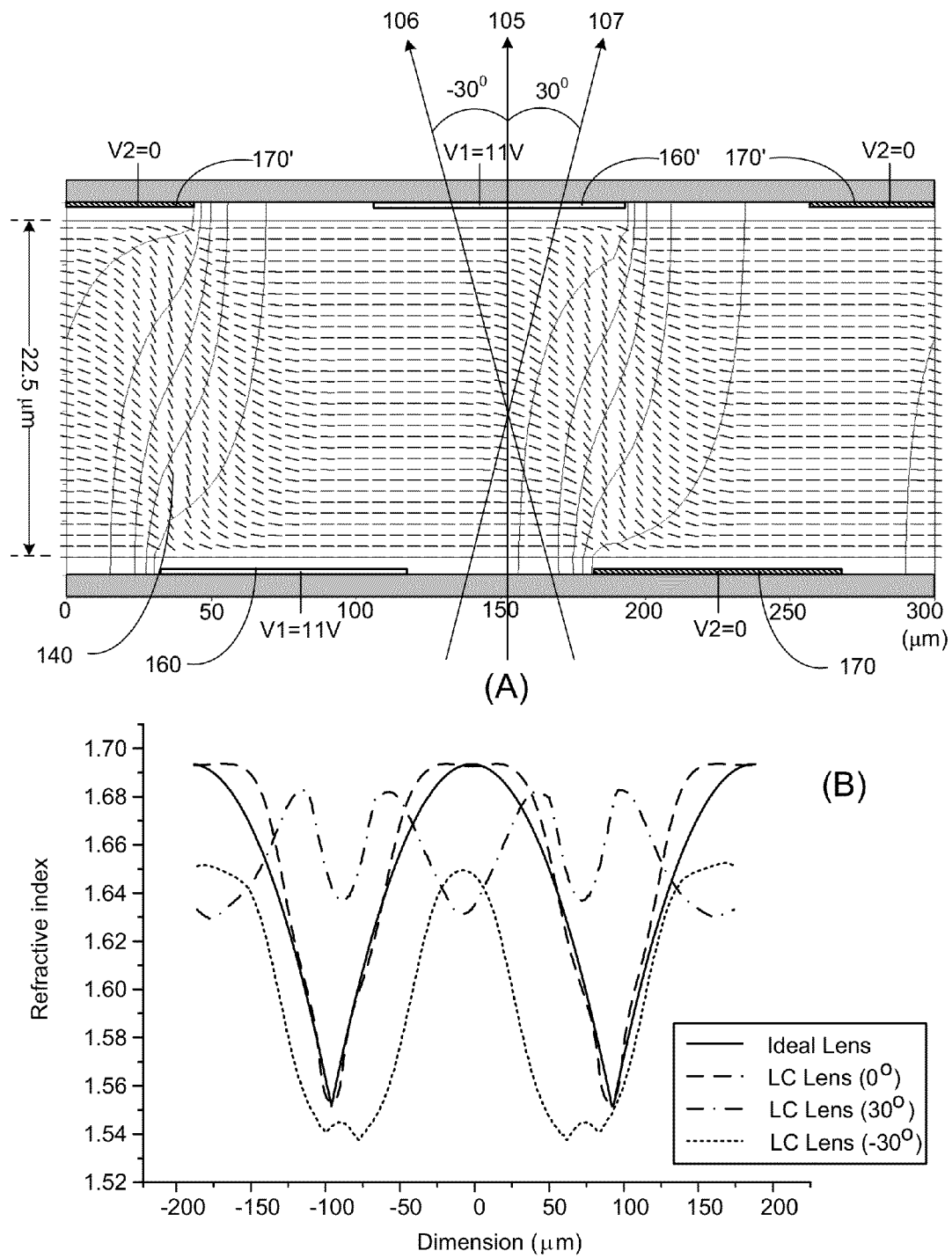
FIG. 4 shows simulation results of an LC lens according to another embodiment of the present invention, (A) LC alignments and electrical field distribution of the LC lens, and (B) refractive indices of the LC lens.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

The description will be made as to the embodiments of the present invention in conjunction with the accompanying drawings in FIGS. 1-17. In accordance with the purposes of this invention, as embodied and broadly described herein, this invention, in one aspect, relates to LC lens structures and applications of the same.

Referring to FIGS. 1A, 1B, 2A and 2B, an LC lens is schematically shown according to one embodiment of the present invention. The LC lens has a first substrate 111 and a second substrate 112 spaced apart from each other, a liquid crystal layer 140 disposed between the first substrate 111 and the second substrate 112, a plurality of first electrode structures 100, and a plurality of first electrode structures 110.

Each first electrode structure 100 has a plurality of first electrodes 120, a plurality of second electrodes 130, a plurality of third electrodes 120' and a plurality of fourth electrodes 130'. The plurality of first electrodes 120 and the plurality of second electrodes 130 are disposed between the first substrate 111 and the liquid crystal layer 140, and spaced-apart and alternately arranged along a first transversal direction 101, while the plurality of third electrodes 120' and the plurality of fourth electrodes 130' are disposed between the second substrate 112 and the liquid crystal layer 140, and spaced-apart and alternately arranged along the first transversal direction 101. Each two adjacent first and second electrodes 120 and 130 in each first electrode structure 100 define a space 125 therebetween, while each two adjacent third and fourth electrodes 120' and 130' in each first electrode structure 100 define a space 135 therebetween. The space 125/135 defined between two corresponding adjacent electrodes 120/120' and 130/130' has a width, Px. Additionally, each electrode of each first electrode structure 100 has a width, W. As shown in FIG. 1A, in the first electrode structure 100, each of the first and second electrodes 120/130 is overlapped with the space 135 defined between two corresponding adjacent third and fourth electrodes 120' and 130' in a vertical projection direction 103, and each of the third and fourth electrodes 120'/130' is overlapped with the space 125 defined between two corresponding adjacent first and second electrodes 120 and 130 in the vertical projection direction 103. As such, each of the first electrodes 120 and the second electrodes 130 and a corresponding one of the third electrodes 120' and the fourth electrodes 130' of each first electrode structure 100 are aligned at a left tilted angle, $\theta_1$, as shown in FIG. 1A. Furthermore, each electrode of the first electrode structure 100 has a central portion 120c and two side portions 120a and 120b oppositely extending from the central portion 120c along the transversal direction 101. The central portion 120c and the two side portions 120a and 120b of each of the first and second electrodes 120 and 130 of the first electrode structure 100 are respectively overlapped with the space 135 and the two corresponding adjacent third and fourth electrodes 120' and 130' of the first electrode structure 100, in the vertical projection direction 103, and vice versa.

Each second electrode structure 120 has a plurality of first electrodes 160, a plurality of second electrodes 170, a plurality of third electrodes 160' and a plurality of fourth electrodes 170'. The plurality of first electrodes 160 and the plurality of second electrodes 170 are disposed between the first substrate 111 and the liquid crystal layer 140, and spaced-apart and alternately arranged along the first transversal direction 101, while the plurality of third electrodes 160' and the plurality of fourth electrodes 170' are disposed between the second substrate 112 and the liquid crystal layer 140, and spaced-apart and alternately arranged along the first transversal direction 101. Each two adjacent first and second electrodes 160 and 170 in each second electrode structure 110 define a space 165 therebetween, and each two adjacent third and fourth electrodes 160' and 170' in each second electrode structure 110 define a space 175 therebetween. The space 165/175 defined between two corresponding adjacent electrodes 160/170' and 160/170' has a width, Px. Additionally, each electrode of each second electrode structure 110 has a width, W. As shown in FIG. 1B, in the second electrode structure 110, each of the first and second electrodes 160/170 is overlapped with the space 175 defined between two corresponding adjacent third and fourth electrodes 160' and 170' in a vertical projection direction 103, and each of the third and fourth electrodes 160'/170' is overlapped with the space 165 defined between two corresponding adjacent first and second electrodes 160 and 170 in the vertical projection direction 103. As such, each of the first electrodes 160 and the second electrodes 170 and a corresponding one of the third electrodes 160' and the fourth electrodes 170' of each second electrode structure 110 are aligned at a right tilted angle, $\theta_2$, as shown in FIG. 1B. Moreover, each electrode of the second electrode structure 110 also has a central portion 160c and two side portions 160a and 160b oppositely extending from the central portion 160c along the transversal direction 101. The central portion 160c and the two side portions 160a and 160b of each of the first and second electrodes 160 and 170 of the second electrode structure 110 are respectively overlapped with the space 175 and the two corresponding adjacent third and fourth electrodes 160' and 170' of the second electrode structure 110, in the vertical projection direction 103, and vice versa.

The plurality of first electrode structures 100 and the plurality of second electrode structures 110 are alternately arranged along a second transversal direction 102, which is generally perpendicular to the first transversal direction 101. As shown below, the first and second transversal directions 101 and 102 are respectively coincident with a row direction and a column direction of an electrode matrix.

Each electrode of the first and second electrode structures 100 and 110 can be formed of a transparent conductive material, a conductive material or a combination thereof, and a geometric shape of rectangle, square, circle, diamond, or polygon, or the likes. The transparent conductive material can be, such as, indium tin oxide (ITO), indium zinc oxide (IZO), or the likes. The conductive material can be a metal or an alloy with pattern, such as, aluminum, copper, silver, gold, titanium, chromium, molybdenum, tungsten, cadmium, nickel, or the likes. Each electrode of the first and second electrode structures 100 and 110 can be formed of a stacked layer or a composition layer of the transparent conductive material and the conductive material.

Additionally, the LC lens 1 may optionally have a first alignment layer 151 disposed between the first electrode structure 120 and the LC layer 140, and a second alignment layer 152 disposed between the LC layer 140 and the second electrode structure 130. The first alignment layer 151 and the second alignment layer 152 are formed of, for example, a polyimide material.

In one embodiment, for each of the first and second electrode structures 100 and 110, the first electrodes 120 and 160 are electrically coupled to a first voltage V1, the second electrodes 130 and 170 are electrically coupled to a second voltage V2, the third electrodes 120' and 160' are electrically coupled to a second voltage V2, and the fourth electrodes 130' and 170' are electrically coupled a fourth voltage V4, respectively. Alternatively, in operation, the first voltage V1 is applied to the first electrodes 121 of the first and second electrode structures 100 and 110, the second voltage V2 is applied to the second electrodes 122 of the first and second electrode structures 100 and 110, the third voltage V3 is applied to the third electrodes 131 of the first and second electrode structures 100 and 110, and the fourth voltage V4 is applied to the fourth electrodes 132 of the first and second electrode structures 100 and 110, respectively. In one embodiment, the first voltage V1 is the same as one of the third and fourth voltages V3 and V4, and the second voltage V2 is same as the other of the third and fourth voltages V3 and V4. Preferably, V1=V3 and V2=V4. In one embodiment, the third and fourth voltages V3 and V4 are zero. In another embodiment, the third and fourth voltages V3 and V4 substantially different from one another. Each of the first, second, third and further voltages V1-V4 is a DC voltage or an AC voltage.

Accordingly to the invention, no disclination lines of the LC distribution occur over the electrodes of the LC lens, when driven in certain driving modes.

For example, in a first driving mode as shown in FIG. 3A, the first and third electrodes 120 and 120' of the first electrode structure 100 are applied with a predetermined voltage V1=+11V, while the second and fourth electrodes 130 and 130' of the first electrode structure 100 are applied with zero voltage, V2=0. Accordingly, there are no disclination lines of the LC distribution over the electrodes of the LC lens. As shown in FIG. 3B, the lens profile of the refractive index variation in the direction of a normal incident light 105 is substantially proximal to the curvature of an ideal lens. The lens profile of the refractive index variation in the direction of a right oblique incident light 107, for example, at an angle of 30° from the normal incident direction 105, is substantially proximal to the curvature of a lens. However, the refractive index variation in the direction of a left oblique incident light 106, for example, at an angle of −30° from the normal incident direction 105 loses the lens profile, which thus results in asymmetric lens profiles for the left and right oblique lights.

In a second driving mode as shown in FIG. 4A, the first and third electrodes 160 and 160' of the second electrode structure 110 are applied with the predetermined voltage V1=+11V, while the second and fourth electrodes 170 and 170' of the second electrode structure 110 are applied with zero voltage, V2=0. Accordingly, there are no disclination lines of the LC distribution over the electrodes of the LC lens. As shown in FIG. 4B, the lens profile of the refractive index variation in the direction of a normal incident light 105 is substantially proximal to the curvature of an ideal lens. The lens profile of the refractive index variation in the direction of a left oblique incident light 106, for example, at an angle of −30° from the normal incident direction 105, is substantially proximal to the curvature of a lens. However, the refractive index variation in the direction of a right oblique incident light 107, for example, at an angle of 30° from the normal incident direction 105 loses the lens profile, which thus results in asymmetric lens profiles for the left and right oblique lights.

In certain embodiments, the predetermined voltage can vary from about ±1 V to ±50 V.

In a third driving mode, all the first, second, third and fourth voltages V1, V2, V3 and V4 are zero, i.e., all the electrodes of the first and second electrode structures 100 and 110 are grounded. The LC lens has no lens effect, but a transparent optical component.

As disclosed below, such properties of the LC lens can be employed in a display to operably switch between a 2D display mode and a 3D display mode. Further, the display in the 3D display mode can provide viewers 3D effects with different wide viewing angles by changing the driving modes (driving voltages).

It should be appreciated that the exemplary LC lens of FIGS. 1-4 having one first electrode structure 100 and one second electrode structure 110 with each structure having a few of electrodes is shown merely for the illustration purpose of the invention, and the numbers of the first electrode structures 100 and the second electrode structures 110 and the numbers of the first, second, third and fourth electrodes are generally larger numbers.

According to in invention, the liquid crystal lens has the plurality of first electrode structures 100 and the plurality of second electrode structures 110 alternately arranged along the second transversal direction 102. As such, the plurality of first electrodes 120 and 160 and the plurality of second electrodes 130 and 170 of the plurality of first electrode structures 100 and the plurality of second electrode structures 110 define a first electrode matrix disposed between and the second substrate 111 and the liquid crystal layer 140, and the plurality of third electrodes 120' and 160' and the plurality of fourth electrodes 130' and 170' of the plurality of first electrode structures 100 and the plurality of second electrode structures 110 define a second electrode matrix disposed between the liquid crystal layer 140 and the second substrate 112. Accordingly, each row of the first electrode matrix and a corresponding row of the second electrode matrix constitute one of the plurality of first electrode structures 100 and the plurality of second electrode structures 110. Additionally, each electrode in each row of the first electrode matrix is overlapped with the space defined between two corresponding adjacent electrodes in the corresponding row of the second electrode matrix, and vice versa.

FIGS. 5-11 schematically show various patterns of electrode matrixes 500, 600, 700, 800, 900, 1000, or 1100, respectively, according to different embodiments of the invention. Each electrode matrix 500, 600, 700, 800, 900, 1000, or 1100 can be the first electrode matrix or the second electrode matrix. Without intend to limit the scope of the invention, the following disclosure of each electrode matrix 500, 600, 700, 800, 900, 1000, or 1100 is in connection with arrangements (or patterns) of the first electrodes 120/160 and the second electrodes 130/170 of the first electrode matrix. It should be appreciated that the disclosure is also applied to the second electrode matrix.

As shown in FIGS. 5-11, each electrode matrix 500, 600, 700, 800, 900, 1000, or 1100 has a plurality of electrode rows 511 along the first transversal direction 101 and a plurality of electrode columns 512 along the second transversal direction 102 that is coincident with the longitudinal direction. In each odd electrode row 511, the first electrodes 120 and the second electrodes 130 are alternately arranged, and each two adjacent first and second electrodes 120 and 130 define the space 125 therebetween, while in each even electrode row 511, the first electrodes 160 and the second electrodes 170 are alternately arranged, and each two adjacent first and second electrodes 160 and 170 define the space 165 therebetween. Accordingly, each odd electrode row 511 corresponds to a first electrode structure 100, while each even electrode row 511 corresponds to a second electrode structure 110. Alternatively, each odd electrode row 511 can be corresponding to a second electrode structure 100, while each even electrode row 511 can be corresponding to a first electrode structure 110.

In addition, the arrangements of the plurality of first electrodes 120/130 and the plurality of second electrodes 130/170 in the plurality of electrode columns 512 of each electrode matrix 500, 600, 700, 800 or 900, 1000, or 1100 are different from each other.

Figure 5:
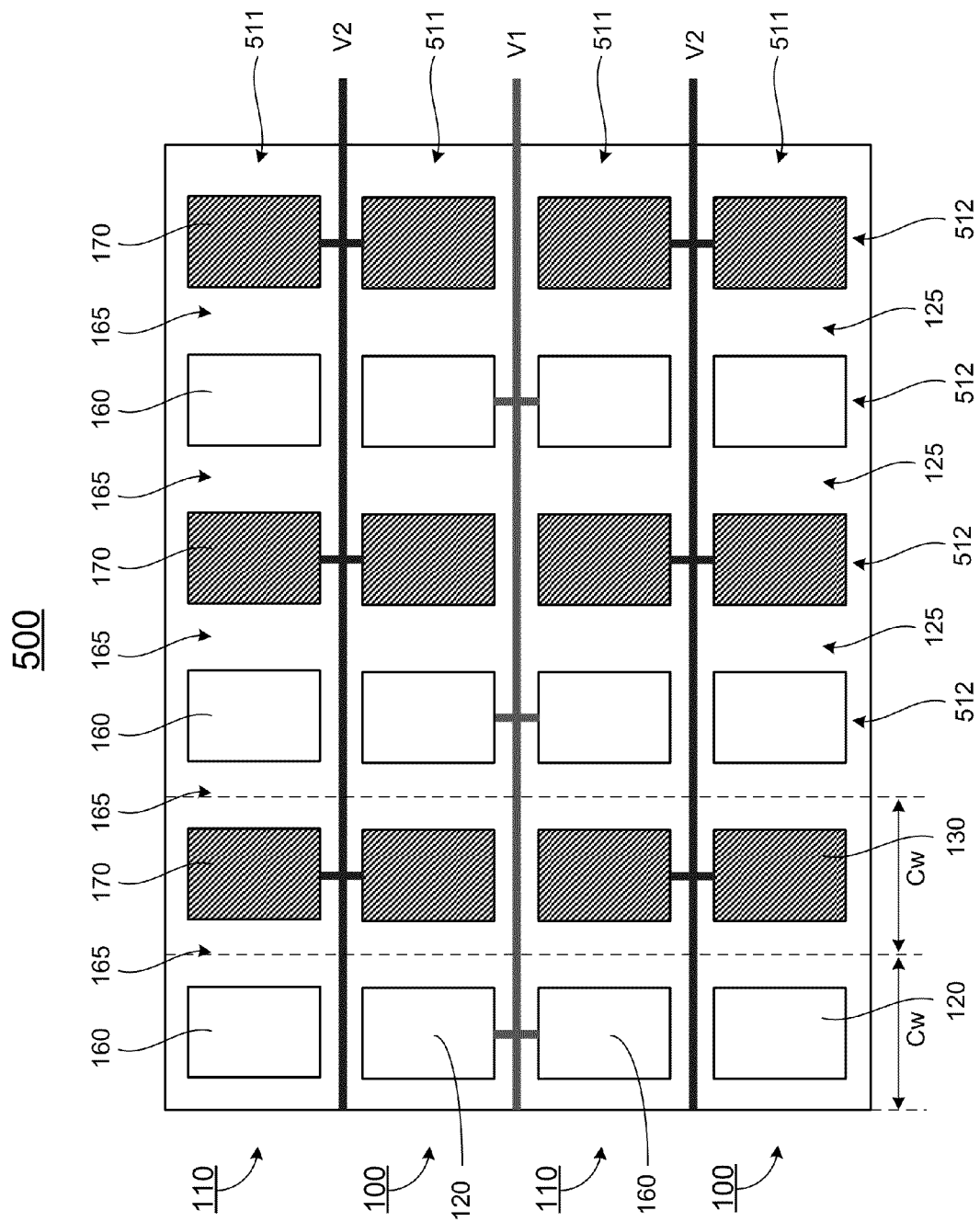
FIG. 5 shows schematically an electrode matrix of an LC lens according to one embodiment of the present invention.

Specifically, as shown in FIG. 5, for the electrode matrix 500, the first electrodes 120/130 are arranged in the odd electrode columns 512 of the matrix, while the second electrodes 130/170 are arranged in the even electrode columns 512 of the matrix. Alternatively, the first electrodes 120/130 can be arranged in the even electrode columns 512 of the matrix, while the second electrodes 130/170 can be arranged in the odd electrode columns 512 of the matrix (not shown).

Figure 6:
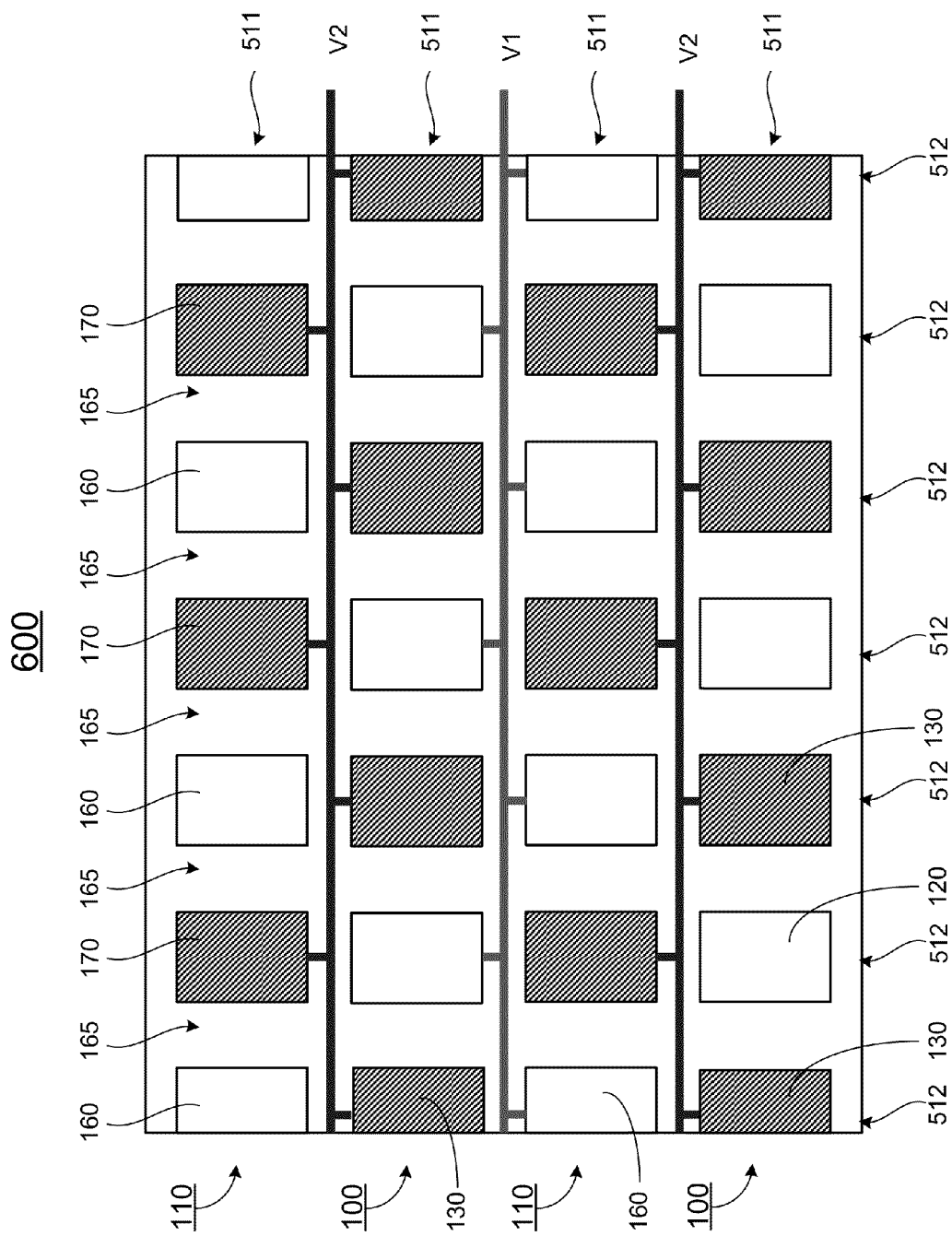
FIG. 6 shows schematically an electrode matrix of an LC lens according to another embodiment of the present invention.

As shown in FIG. 6, for the electrode matrix 600, the first electrodes 120/130 and the second electrodes 130/170 are alternately arranged in each electrode column 512 of the matrix.

Figure 7:
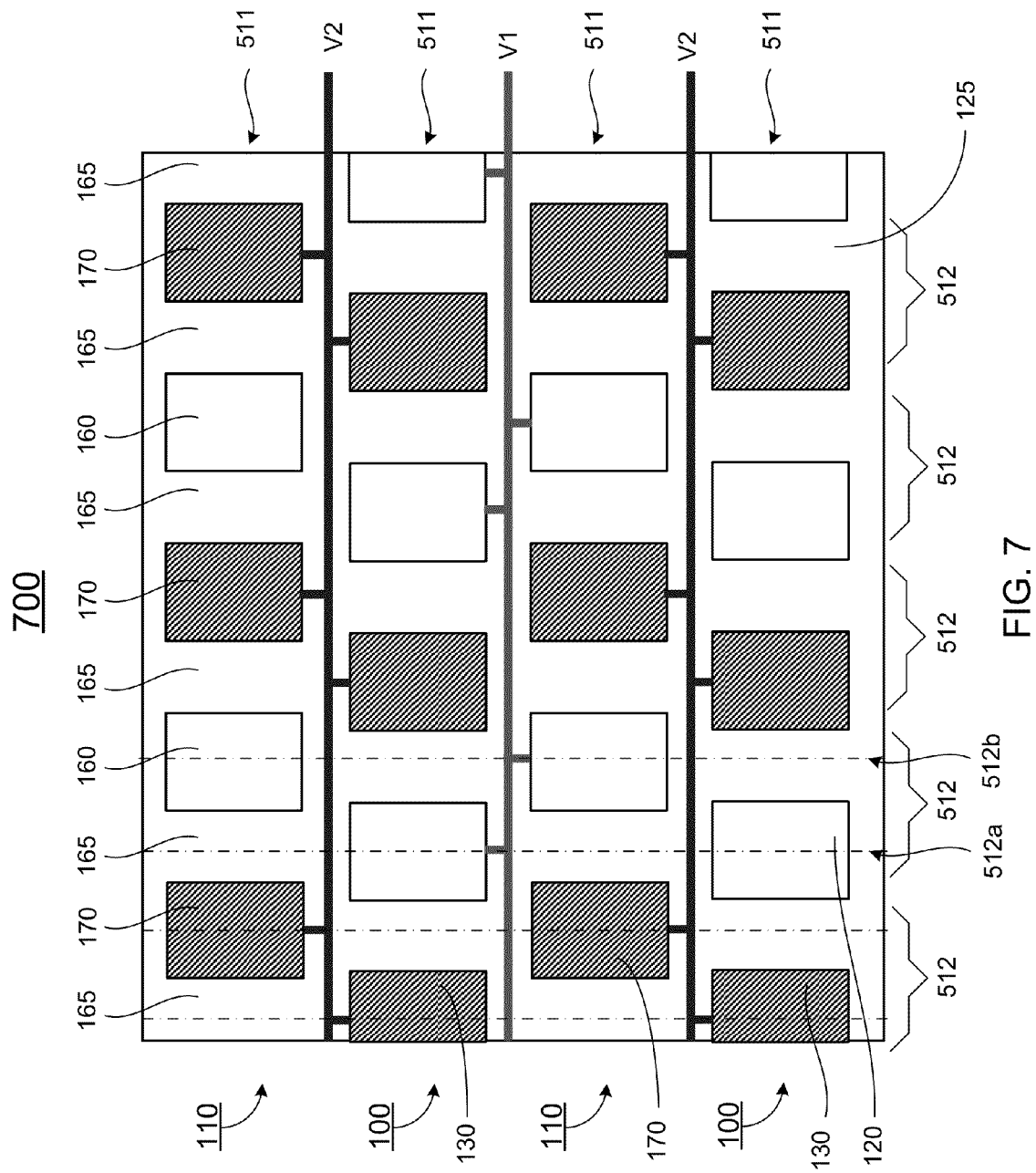
FIG. 7 shows schematically an electrode matrix of an LC lens according to yet another embodiment of the present invention.

As shown in FIG. 7, for the electrode matrix 700, the first electrodes 120/130 are arranged in the even electrode columns 512 of the matrix and the second electrodes 130/170 are arranged in the odd electrode columns 512 of the matrix. Each electrode column 512 has a first sub-column 512a and a second sub-column 512b displaced from the first sub-column 512a. As such, the first sub-column 512a of each electrode column 512 has electrodes in the odd rows and no electrode in the even rows, while the second sub-column 512b of each electrode column 512 has electrodes in the even rows and no electrode in the odd rows. More specifically, the first sub-column 512a of each odd electrode column 512 has the second electrodes 130 in the odd rows and no electrode in the even rows, the second sub-column 512b of each odd electrode column 512 has the second electrodes 170 in the even rows and no electrode in the odd rows, the first sub-column 512a of each even electrode column 512 has the first electrodes 120 in the odd rows and no electrode in the even rows, the second sub-column 512b of each even electrode column 512 has the first electrodes 160 in the even rows and no electrode in the odd rows.

Figure 8:
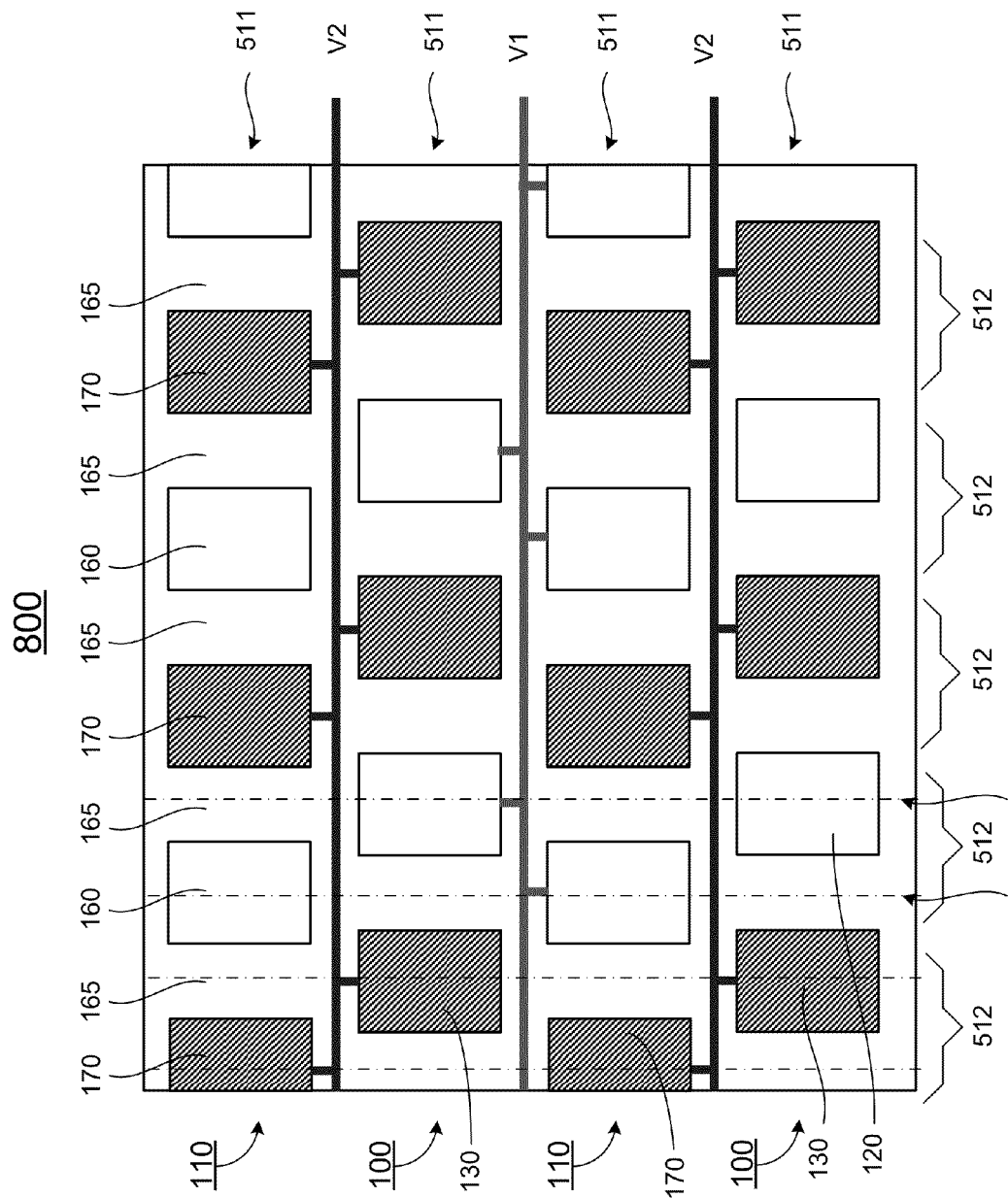
FIG. 8 shows schematically an electrode structure matrix of an LC lens according to a further embodiment of the present invention.

As shown in FIG. 8, the electrode matrix 800 has a similar arrangement to the electrode matrix 700 shown in FIG. 7, except that the first sub-column 512a of each electrode column 512 has electrodes in the even rows and no electrode in the odd rows and, while the second sub-column 512b of each electrode column 512 has and electrodes in the odd rows and no electrode in the even rows. Moreover, the first sub-column 512a of each odd electrode column 512 has the second electrodes 170 in the even rows and no electrode in the odd rows, the second sub-column 512b of each odd electrode column 512 has the second electrodes 130 in the odd rows and no electrode in the even rows, the first sub-column 512a of each even electrode column 512 has the first electrodes 160 in the even rows and no electrode in the odd rows, the second sub-column 512b of each even electrode column 512 has the first electrodes 120 in the odd rows and no electrode in the even rows.

Figure 9:
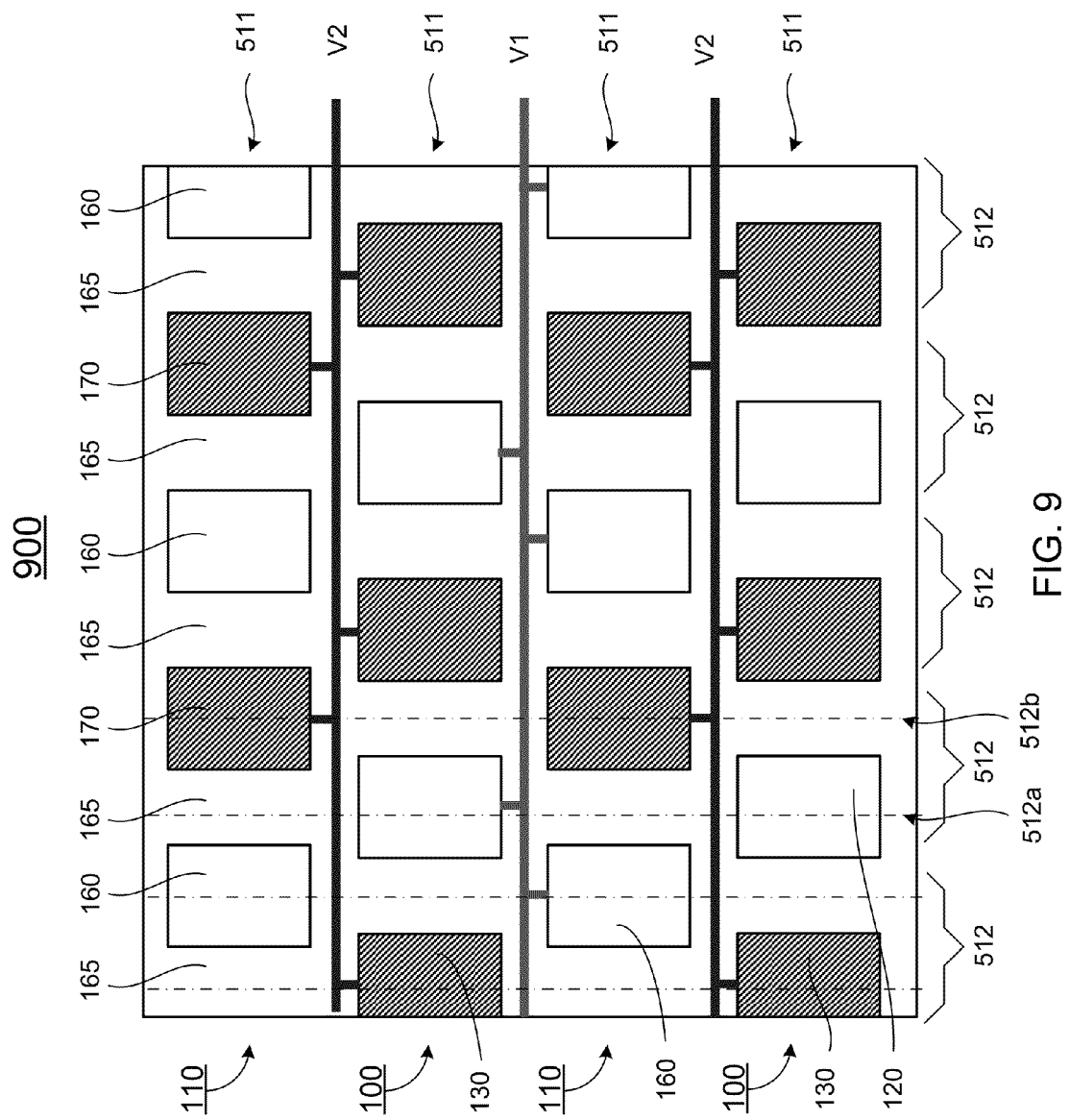
FIG. 9 shows schematically an electrode matrix of an LC lens according to yet a further embodiment of the present invention.

As shown in FIG. 9, for the electrode matrix 900, the first electrodes 120/130 and the second electrodes 130/170 are alternately arranged in each electrode columns 512 of the matrix. Further, each electrode column 512 has a first sub-column 512a and a second sub-column 512b displaced from the first sub-column 512a. In the embodiment, the first sub-column 512a of each odd electrode column 512 has the second electrodes 130 in the odd rows and no electrode in the even rows, the second sub-column 512b of each odd electrode column 512 has the first electrodes 160 in the even rows and no electrode in the odd rows, the first sub-column 512a of each even electrode column 512 has the first electrodes 120 in the odd rows and no electrode in the even rows, the second sub-column 512b of each even electrode column 512 has the second electrodes 170 in the even rows and no electrode in the odd rows.

Figure 10:
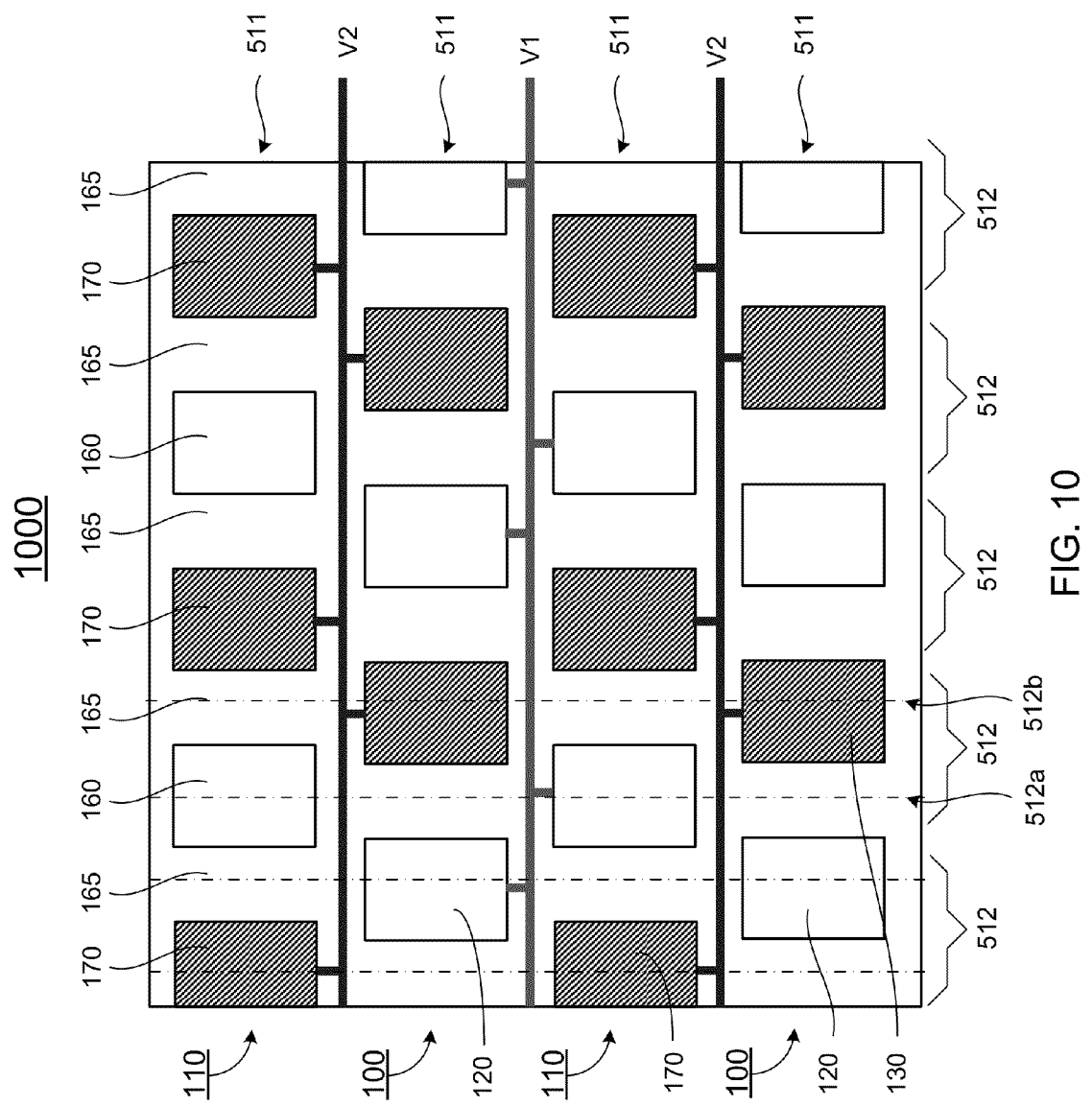
FIG. 10 shows schematically an electrode matrix of an LC lens according to one embodiment of the present invention.

As shown in FIG. 10, the electrode matrix 1000 has a similar arrangement to the electrode matrix 900 shown in FIG. 9, except that the first sub-column 512a of each odd electrode column 512 has the second electrodes 170 in the even rows and no electrode in the odd rows, the second sub-column 512b of each odd electrode column 512 has the first electrodes 120 in the odd rows and no electrode in the even rows, the first sub-column 512a of each even electrode column 512 has the first electrodes 160 in the even rows and no electrode in the odd rows, the second sub-column 512b of each even electrode column 512 has the second electrodes 130 in the odd rows and no electrode in the even rows.

Figure 11:
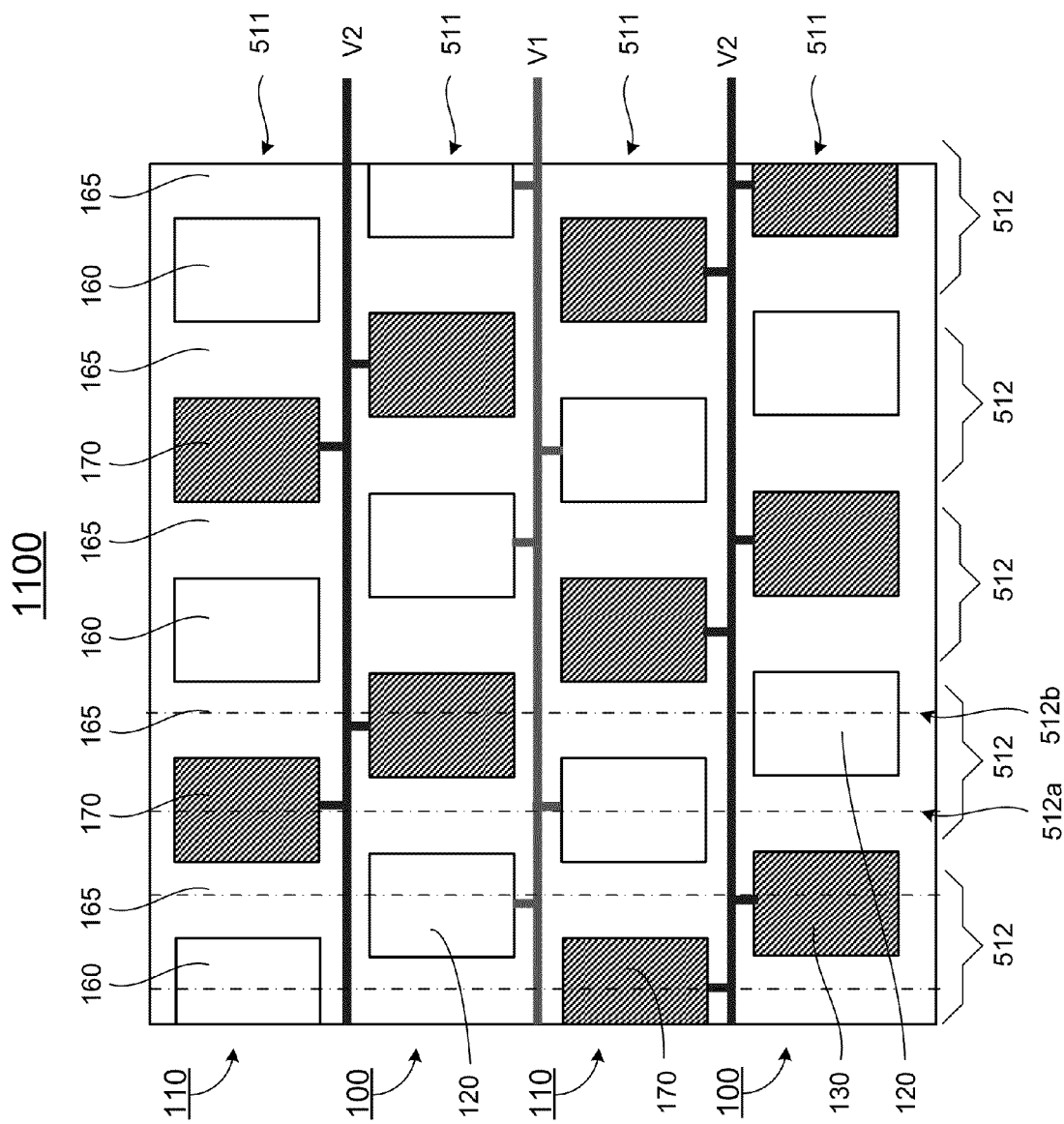
FIG. 11 shows schematically an electrode matrix of an LC lens according to another embodiment of the present invention.

As shown in FIG. 11, for the electrode matrix 1100, the first sub-column 512a of each electrode column 512 has the first electrodes 160 and the second electrodes 170 alternately arranged in the even rows and no electrode in the odd rows, while the second sub-column 512b of each electrode column 512 has the first electrodes 120 and the second electrodes 130 alternately arranged in the odd rows and no electrode in the even rows.

According to embodiments of the invention, various LC lenses are provided by utilizing the above disclosed electrode structures. Specifically, the LC lens includes has a first (bottom) substrate, a first (bottom) electrode matrix disposed on the first substrate, an LC layer disposed on the first electrode matrix, a second (top) electrode matrix disposed on the LC layer, and a second (top) substrate deposed on the second electrode matrix. The first and second electrode matrixes are positioned such that each electrode row of the first electrode matrix is aligned with a corresponding electrode row of the second electrode matrix, and each electrode in each electrode row of the first electrode matrix is overlapped with the space defined between two corresponding adjacent first and second electrodes in the corresponding electrode row of the second electrode matrix, and vice versa. Each of the first and second electrode matrixes can be one of the above disclosed electrode matrixes 500, 600, 700, 800, 900, 1000 and 1100, as shown in FIGS. 5-11, respectively.

According to the invention, each row of the first electrode matrix and a corresponding row of the second electrode matrix is corresponding one of the plurality of first electrode structures 100 and the plurality of second electrode structures 110 of the LC lens. Both the first and second electrode structures in the LC lens can be the same or different from one another. The latter is also called as a LC lens with a hybrid driving mode Referring to FIGS. 12 and 13, without intent to limit the scope of the invention, two exemplary embodiments of an LC lens are schematically shown according to the invention.

Figure 12:
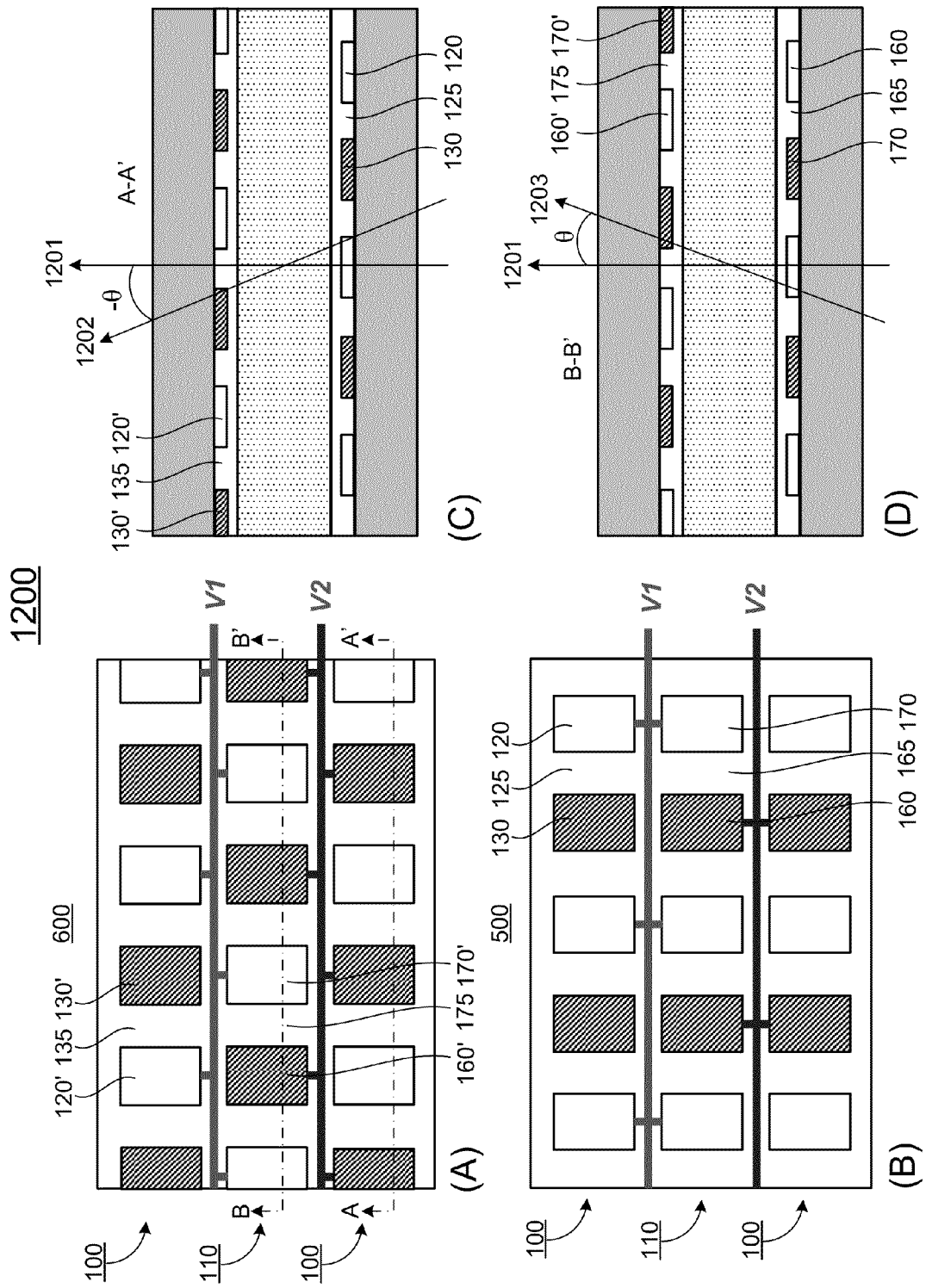
FIG. 12 shows schematically an LC lens according to one embodiment of the present invention, (A) a top electrode matrix of the LC lens on the second substrate, (B) a bottom electrode matrix of the LC lens on the first substrate, (C) a cross-sectional view of the LC lens along line A-A', and (D) a cross-sectional view of the LC lens along line B-B'.

In the LC lens 1200 shown in FIG. 12, the top electrode matrix is corresponding to the electrode matrix 600 shown in FIG. 6, while the bottom electrode matrix is corresponding to the electrode matrix 500 shown in FIG. 5. For such an LC lens 1200, it can be characterized with multi-areas with each area corresponding to one electrode row. For example, each of the odd electrode rows is corresponding to the first electrode structure 100, while each of the even electrode rows is corresponding to the second electrode structure 110. For each of the first and second electrode structures 100 and 110, its lens profile in the direction of a normal incident light 1201 is corresponding to the curvature of an ideal lens. Additionally, each of the first and second electrode structures 100 and 110 operably has the lens profile substantially proximal to the curvature of a lens in particular angles. For example, in the area (the odd rows) shown in FIG. 12C, it produces the ideal curvature profile of a lens for a normal incident light 1201 and substantially proximal to the curvature profile of the lens for an oblique incident light 1202 at an angle −θ relative to the normal incident light 1201, while in the area (the even rows) shown in FIG. 12D, it also produces the ideal curvature profile of a lens for the normal incident light 1201 and substantially proximal to the curvature profile of the lens for an oblique incident light 1203 at an angle θ relative to the normal incident light 1201. Accordingly, the LC lens 1200 has the better lens profiles over very wide viewing angles.

Figure 13:
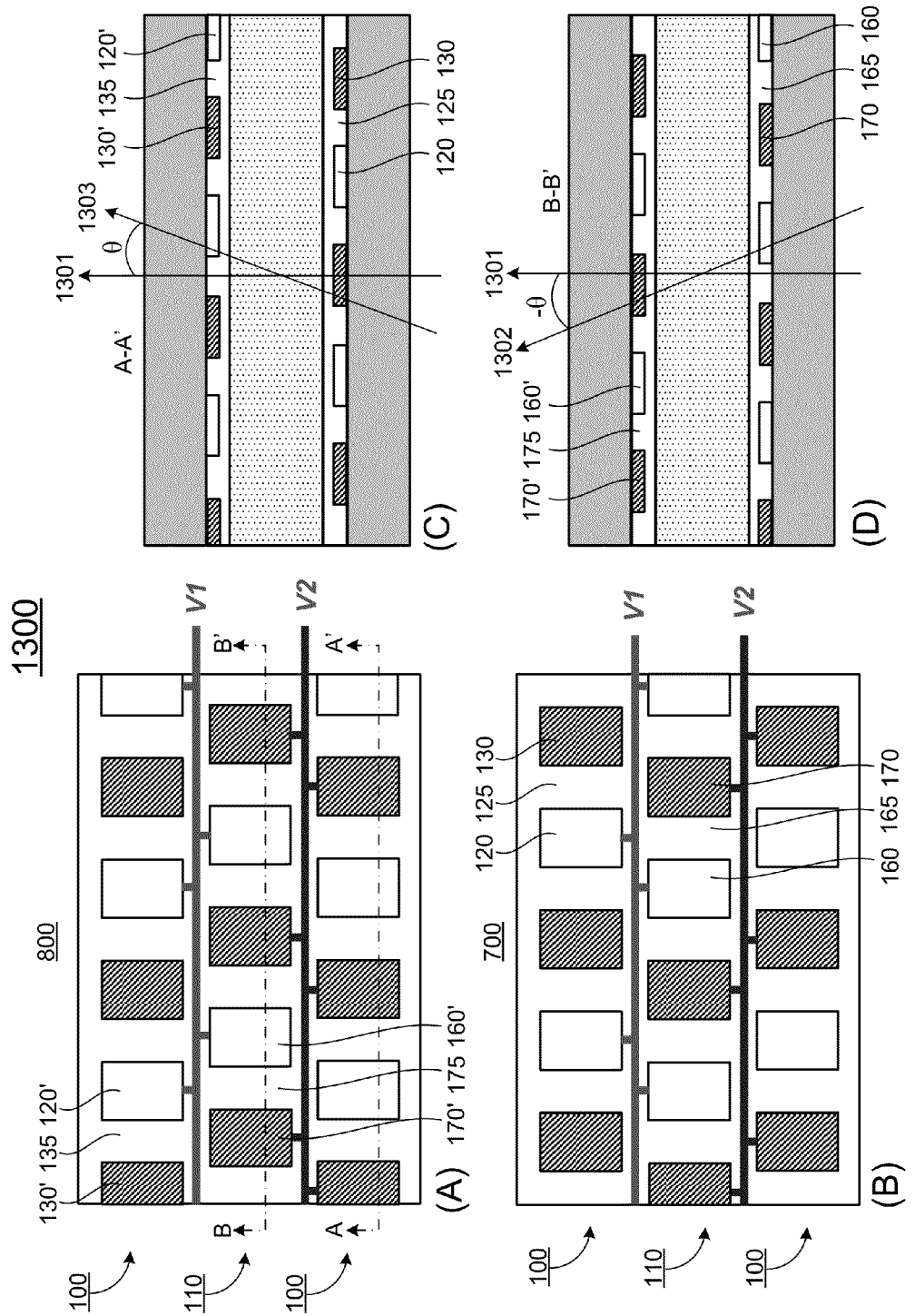
FIG. 13 shows schematically an LC lens according to another embodiment of the present invention, (A) a top electrode matrix of the LC lens on the second substrate, (B) a bottom electrode matrix of the LC lens on the first substrate, (C) a cross-sectional view of the LC lens along line A-A', and (D) a cross-sectional view of the LC lens along line B-B'.

For the LC lens 1300 shown in FIG. 13, the top electrode matrix is corresponding to the electrode matrix 800 shown in FIG. 8, while bottom electrode matrix is corresponding to the electrode matrix 700 shown in FIG. 7. Similarly, the LC lens 1300 can also be characterized with multi-areas with each area corresponding to one electrode row. For example, each of the odd electrode rows is corresponding to the first electrode structure 100, while each of the even electrode rows is corresponding to the second electrode structure 110. Each area operably has better lens profiles in the normal direction and particular angles. For example, in the area shown in FIG. 13C, it produces the ideal curvature profile of a lens for a normal incident light 1301 and substantially proximal to the curvature profile of the lens for an oblique incident light 1303 at an angle θ relative to the normal incident light 1301, while in the area shown in FIG. 13D, it produces the ideal curvature profile of a lens for the normal incident light 1301 and substantially proximal to the curvature profile of the lens for an oblique incident light 1302 at an angle −θ relative to the normal incident light 1301. Accordingly, the LC lens 1300 has the better lens profiles over very wide viewing angles.

Figure 14:
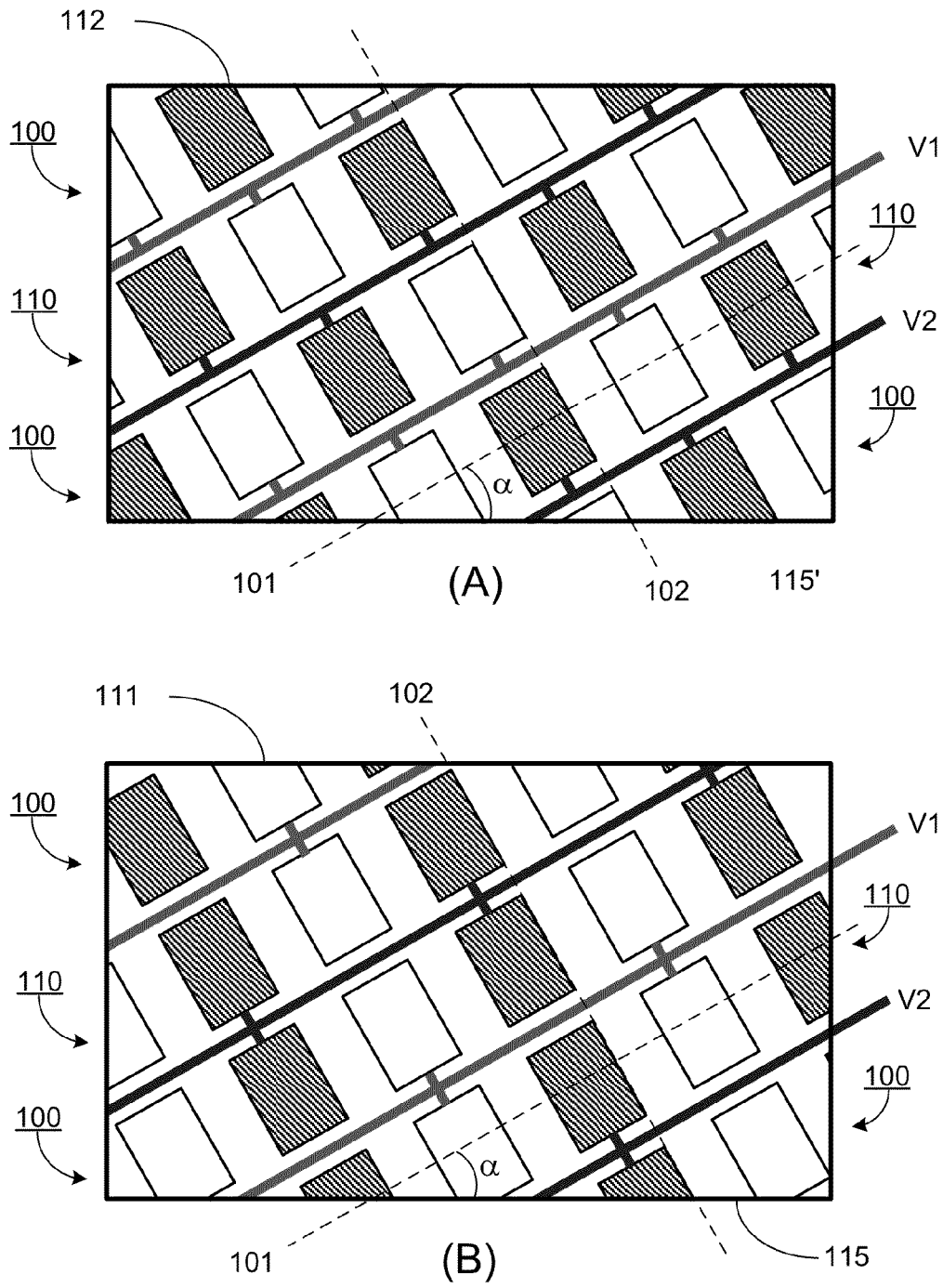
FIG. 14 shows schematically an LC lens according to one embodiment of the present invention, (A) a top electrode matrix of the LC lens on the second substrate, and (B) a bottom electrode matrix of the LC lens on the first substrate.

FIG. 14 shows schematically an LC lens 1400 according to one embodiment of the invention. Similarly, the LC lens has a first substrate 111 and a second substrate 112 spaced apart from each other, a liquid crystal layer (not shown) disposed between the first substrate 111 and the second substrate 112, a plurality of first electrode structures 100 and a plurality of first electrode structures 110 aligned along the first transversal direction 101. The plurality of first electrode structures 100 and the plurality of second electrode structures 120 are alternately arranged along the second transversal direction 102, which is generally perpendicular to the first transversal direction 101. However, in the exemplary embodiment, the first and second electrode structures 100 and 110 rotate at an angle α, such that the first transversal direction 101 has the angle α relative to the long edge 115/115' of the first and substrates 111 and 112.

Figure 15:
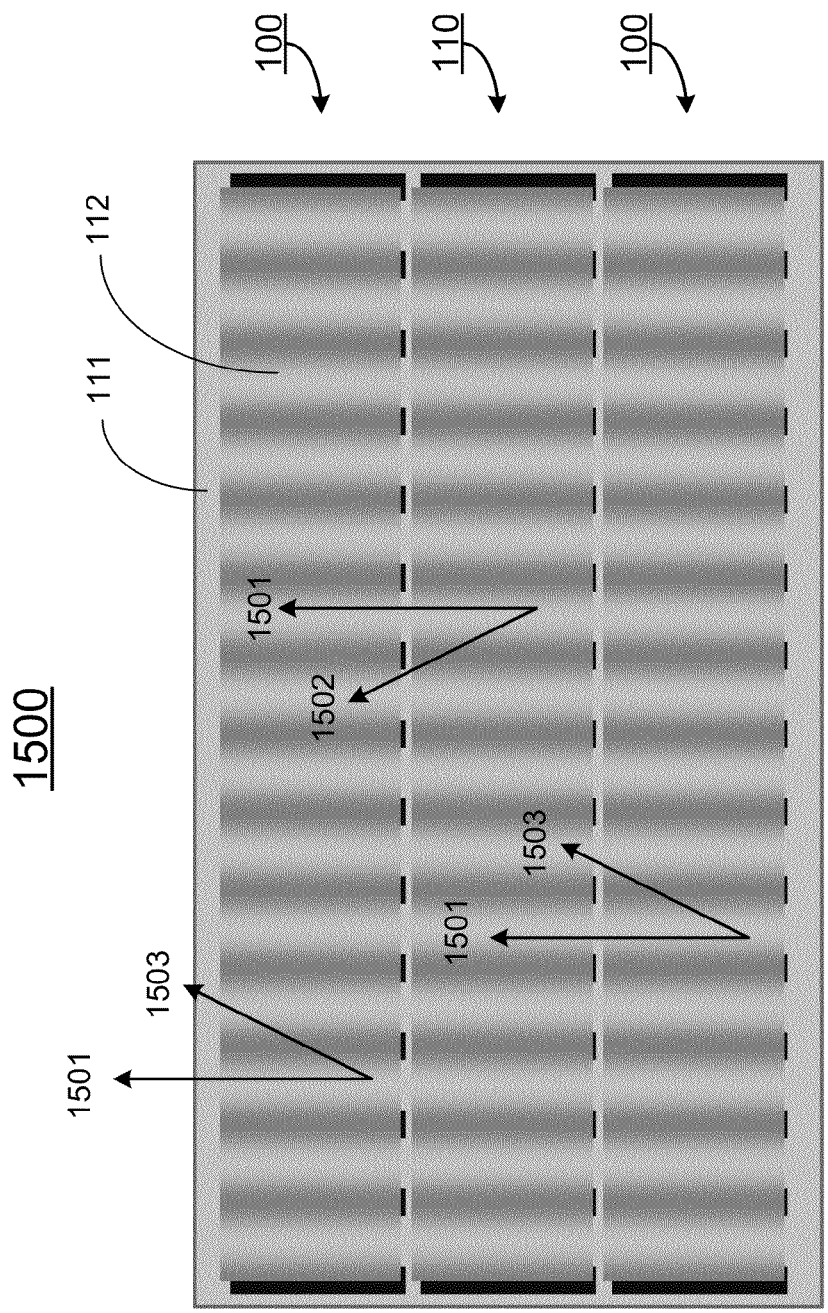
FIG. 15 shows schematically an LC lens according to one embodiment of the present invention.

FIG. 15 shows schematically a hybrid LC lens according to one embodiment of the present invention, where the first and second electrode structures 100 and 110 are substantially different from each other. When driven, both the first and second electrode structures 100 and 110 produce the ideal curvature profile of a lens in the normal direction 1501. However, the first electrode structure 100 produces substantially proximal to the curvature profile of the lens for the oblique incident light 1502, while the second electrode structure 110 produces substantially proximal to the curvature profile of the lens for the oblique incident light 1503.

Figure 16:
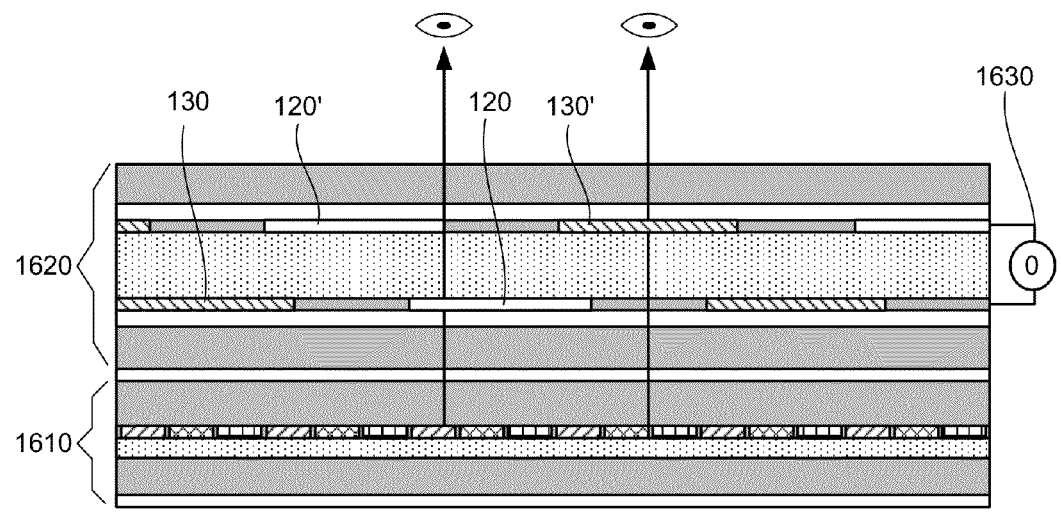
FIG. 16 shows schematically a display device having an LC lens according to one embodiment of the present invention, (A) operating in a 2D display mode; and (B) operating in a 3D display mode.
Figure 16:
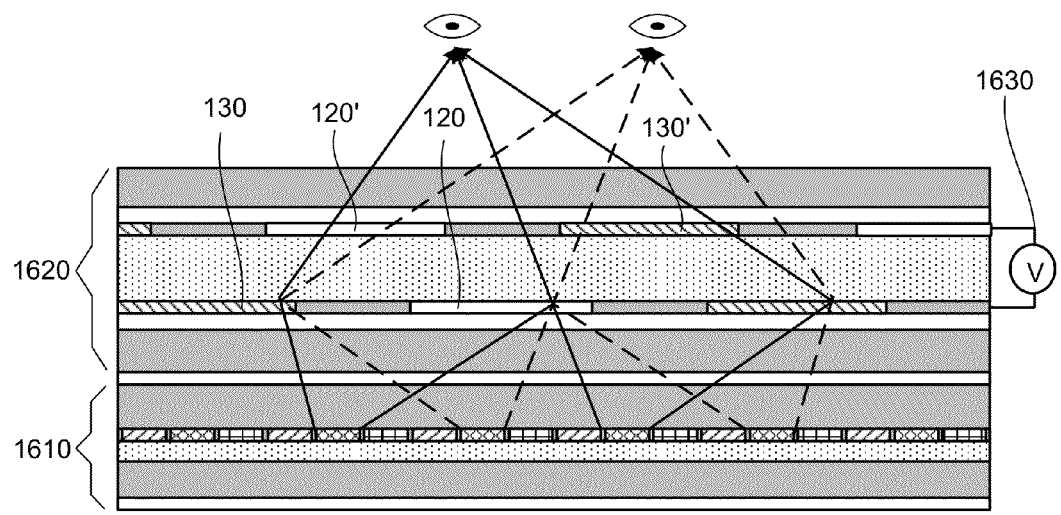

The above LC lens has applications in 3D displays. For example, as shown in FIG. 16, a display device 1600 comprises a display panel 1610, and an LC lens 1620 that is disposed on the display panel 1610. The display panel 1610 can be a liquid crystal display panel, an organic light emitting display panel, an inorganic light emitting display panel, an electro-wetting display panel, a field emission display panel, or a plasma display panel. Further, the display panel 1610 includes a plurality of pixels arranged in an array, and the first electrode structures 100 are disposed corresponding to odd rows of the pixel array and the second electrode structures 110 are disposed corresponding to even rows of the pixel array, or vice versus.

The LC lens 1620 is the LC lens disclosed above. The display device 1600 also have a power supply 1630 for respectively providing a first voltage V1 to the plurality of first electrodes 120/160 of the first and second electrode structures 100 and 110, a second voltage V2 to the plurality of second electrodes 130/170 of the first and second electrode structure 100 and 110, a third voltage V3 to the plurality of third electrodes 120'/160' of the first and second electrode structure 100 and 110, and a fourth voltage V4 to the plurality of fourth electrodes 130'/170' of the first and second electrode structure 100 and 110. Each of the first, second, third and further voltages V1, V2, V3 and V4 can be a DC voltage or an AC voltage.

The display device 1600 can operably switch between a 2D display mode and a 3D display mode, based on the LC lens driving. For example, the display device 1600 operates in the 2D display mode when the first, second, third and fourth voltages V1, V2, V3 and V4 are zero, as shown in FIG. 16A. The display device 1600 however operates in the 3D display mode, as shown in FIG. 16B, when the first voltage V1 is the same as one of the third and fourth voltages V3 and V4, and the second voltage V2 is same as the other of the third and fourth voltages V3 and V4, and the third and fourth voltages V3 and V4 are substantially different from one another. For the 3D display mode, the display device 1600 can track locations of a viewer so as to change the driving mode to provide most optimal 3D image displays to the viewer based on the locations of the viewer. For example, if the viewer is in the first viewing zone, the driving voltages are set V1=V3=11V and V2=V4=0. If the viewer is in the second viewing zone, the driving voltages are set V1=V3=0 and V2=V4=11V. Furthermore, when the viewer is in the first and second viewing zones, as shown in FIG. 16B, the viewer will view the image in a 3D format if the driving voltages are set V1=V3 and V2=V4 are set to be different from each other.

In addition, one aspect of the invention also discloses a method of driving the above disclosed display devices. Generally, the method includes applying a first voltage V1 to the plurality of first electrodes of the first and second electrode structures, a second voltage V2 to the plurality of second electrodes of the first and second electrode structures, a third voltage V3 to the plurality of third electrodes of the first and second electrode structures, and a fourth voltage V4 to the plurality of fourth electrodes of the first and second electrode structures, respectively. Each of the first, second, third and further voltages can be a DC voltage or an AC voltage.

Figure 17:
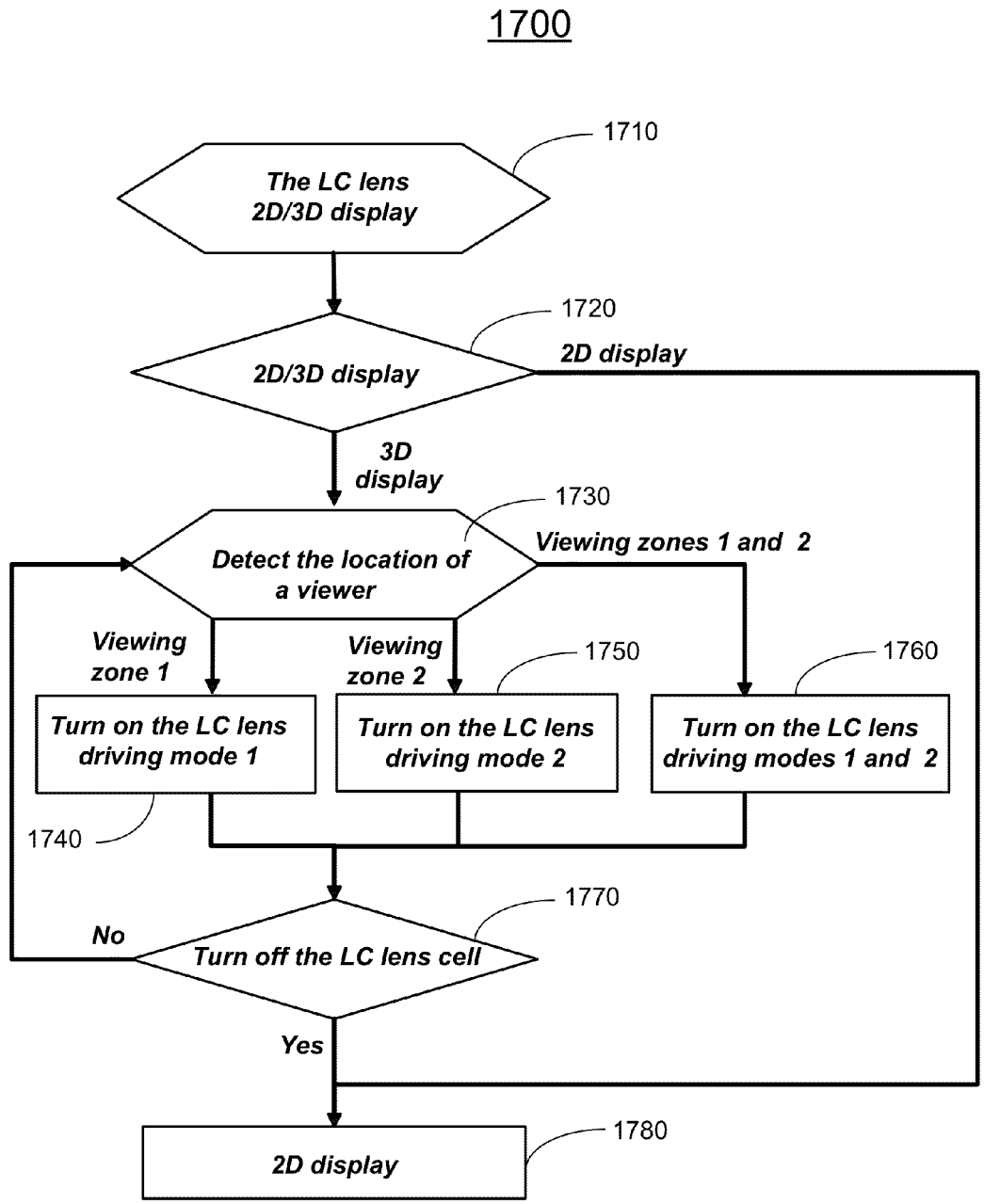
FIG. 17 shows schematically a flowchart of operating a display device in various driving modes according to one embodiment of the present invention.

FIG. 17 shows schematically a flowchart 1700 of operating the display device in various driving modes according to one embodiment of the invention. Specifically, when the LC lens 2D/3D display is powered on (step 1710), it is determined whether the display operates in the 2D display mode or the 3D display mode at step 1720. When the display is set to operate in the 2D display mode, the first, second, third and fourth voltages V1, V2, V3 and V4 are set to be zero, and the display operates in the 2D display mode (step 1780).

Otherwise, when the display is set to operate in the 3D display mode, the location of a viewer (observer) can be detected at step 1730, which can be performed with, for example, motion detection sensors. If the viewer is in both the viewing zones 1 and 2, for example, in the middle view area, the LC lens is driven by both driving modes 1 and 2 at step 1760, i.e. a normal 3D driving mode. If the viewer is in a viewing zone 1, the LC lens is driven (or turned on) by driving mode 1 at step 1740. If the viewer is in a viewing zone 2, the LC lens is driven (or turned on) by driving mode 2 at step 1750. Then, determining whether the LC lens needs being turned off or not is performed at step 1770. If the LC lens is turned off, the display operates in the 2D display mode (step 1780). Otherwise, repeating steps 1730-1770.

In one embodiment, a normal 3D driving mode (both the driving modes 1 and 2) is corresponding to a driving scheme in which the first and third voltages V1 and V3 are same and set to be a predetermined voltage, while the second and fourth voltages V2 and V4 are zero (grounded). The predetermined voltage can be in a range of about ±1 V to ±50 V. The driving mode 1 is corresponding to a driving scheme in which the first and third voltages V1 and V3 are adjusted to be another predetermined voltage, while the second and fourth voltages V2 and V4 are zero. The driving mode 2 is corresponding to a driving scheme in which the first and fourth voltages V1 and V4 are adjusted the predetermined voltage, while the second and third voltages V2 and V3 are zero.

As discussed above, for the 3D display of an image, there is a need to determine the location of the viewer if the display device is driven by the normal 3D driving mode (both the driving modes 1 and 2) or a single driving mode 1 or 2. However, if the display device is driven by the normal 3D driving mode (both the driving modes 1 and 2), no determination of the viewer's location is needed.

In sum, the invention, among other things, recites an LC lens and applications of the same. The LC lens includes a first substrate, a second substrate, an LC layer disposed between the first and second substrates, a plurality of first electrode structures and a plurality of second electrode structures and a second electrode structure disposed between the LC layer and the second substrate. Each of the first and second electrode structures comprises has a plurality of first, second, third and fourth electrodes spaced-apart and alternately arranged along a first transversal direction, where the first and second electrodes are disposed between the first substrate and the LC layer, while the third and fourth electrodes are disposed between the second substrate and the LC layer. In each first electrode structure, each of the first and second electrodes and a corresponding one of the third and fourth electrodes are aligned at a left tilted angle, while in each second electrode structure, each of the first and second electrodes and a corresponding one of the third and fourth electrodes are aligned at a right tilted angle. The first and second electrode structures are alternately arranged along a second transversal direction that is perpendicular to the first transversal direction.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal lens, comprising:
   a first substrate and a second substrate spaced apart from each other;
   a liquid crystal layer disposed between the first substrate and the second substrate;
   a plurality of first electrode structures, each first electrode structure comprising a plurality of first electrodes, a plurality of second electrodes, a plurality of third electrodes and a plurality of fourth electrodes, wherein the plurality of first electrodes and the plurality of second electrodes are disposed between the first substrate and the liquid crystal layer and spaced-apart and alternately arranged along a first transversal direction, and wherein the plurality of third electrodes and the plurality of fourth electrodes are disposed between the second substrate and the liquid crystal layer and spaced-apart and alternately arranged along the first transversal direction such that each of the first electrodes and the second electrodes and a corresponding one of the third electrodes and the fourth electrodes of each first electrode structure are aligned at a left tilted angle; and
   a plurality of second electrode structures, each second electrode structure comprising a plurality of first electrodes, a plurality of second electrodes, a plurality of third electrodes and a plurality of fourth electrodes, wherein the plurality of first electrodes and the plurality of second electrodes are disposed between the first substrate and the liquid crystal layer and spaced-apart and alternately arranged along the first transversal direction, and wherein the plurality of third electrodes and the plurality of fourth electrodes are disposed between the second substrate and the liquid crystal layer and spaced-apart and alternately arranged along the first transversal direction such that each of the first electrodes and the second electrodes and a corresponding one of the third electrodes and the fourth electrodes of each second electrode structure are aligned at a right tilted angle,
   wherein the plurality of first electrode structures and the plurality of second electrode structures are alternately arranged along a second transversal direction that is different from the first transversal direction, wherein each of the first and second transversal directions is parallel to the first and second substrates.

2. The liquid crystal lens of claim 1, further comprising a first alignment layer disposed between the liquid crystal layer and the plurality of first electrodes and the plurality of second electrodes of the plurality of first electrode structures and the plurality of second electrode structures, the first substrate; and
   a second alignment layer disposed between the liquid crystal layer and the plurality of third electrodes and the plurality of fourth electrodes of the plurality of first electrode structures and the plurality of second electrode structures, the second substrate.

3. The liquid crystal lens of claim 1, wherein in each of the plurality of first electrode structures and the plurality of second electrode structures, each two adjacent electrodes define a space therebetween.

4. The liquid crystal lens of claim 3, wherein the plurality of first electrodes and the plurality of second electrodes of the plurality of first electrode structures and the plurality of second electrode structures define a first electrode matrix, and wherein the plurality of third electrodes and the plurality of fourth electrodes of the plurality of first electrode structures and the plurality of second electrode structures define a second electrode matrix, and wherein each row of the first electrode matrix and a corresponding row of the second electrode matrix form one of the plurality of first electrode structures and the plurality of second electrode structures, and each electrode in each row of the first electrode matrix is overlapped with the space defined between two corresponding adjacent electrodes in the corresponding row of the second electrode matrix, and vice versa.

5. The liquid crystal lens of claim 4, wherein in the first electrode matrix, the first electrodes are arranged in the odd columns and the second electrodes are arranged in the even columns, and in the second electrode matrix, the third electrodes are arranged in the odd columns and the fourth electrodes are arranged in the even columns, or vice versa.

6. The liquid crystal lens of claim 4, wherein in the first electrode matrix, the first electrodes and the second electrodes are alternately arranged in each column, and in the second electrode matrix, the third electrodes are arranged in the odd columns and the fourth electrodes are arranged in the even columns, or vice versa.

7. The liquid crystal lens of claim 4, wherein in the first electrode matrix, the first electrodes and the second electrodes are alternately arranged in each column, and in the second electrode matrix, the third electrodes and the fourth electrodes are alternately arranged in each column.

8. The liquid crystal lens of claim 4, wherein each column of the first electrode matrix is aligned with a corresponding column of the second electrode matrix, and wherein each column of the first and second electrode matrixes has a first sub-column and a second sub-column displaced from the first sub-column, such that the first and second sub-columns of each column of the first electrode matrix are respectively aligned with the first and second sub-columns of the corresponding column of the second electrode matrix.

9. The liquid crystal lens of claim 8, wherein in one of the first and second electrode matrixes, the first sub-column of each column has electrodes in the odd rows and no electrode in the even rows, and the second sub-column of each column has electrodes in the even rows and no electrode in the odd rows, and in the other of the first and second electrode matrix, the first sub-column of each electrode column has electrodes in the even rows and no electrode in the odd rows, and the second sub-column of each column has electrodes in the odd rows and no electrode in the even rows.

10. The liquid crystal lens of claim 4, wherein each electrode of the first and second electrode matrixes has a central portion and two side portions oppositely extending from the central portion along the transversal direction, and wherein the central portion and the two side portions of each electrode in each row of the first electrode matrix are respectively overlapped with the space and the two corresponding adjacent electrodes in the corresponding row of the second electrode matrix, and vice versa.

11. The liquid crystal lens of claim 1, wherein each electrode of the first electrode structures and the second electrode structures has a geometric shape of rectangle, square, circle, diamond, or polygon.

12. The liquid crystal lens of claim 1, wherein each electrode of the first electrode structures and the second electrode structures is formed of a transparent conductive material.

13. The liquid crystal lens of claim 1, wherein the plurality of first electrodes of the first electrode matrix is electrically coupled to each other, the plurality of second electrodes of the first electrode matrix is electrically coupled to each other, the plurality of third electrodes of the second electrode matrix is electrically coupled to each other, and the plurality of fourth electrodes of the second electrode matrix is electrically coupled to each other.

14. The liquid crystal lens of claim 13, wherein in operation,
a first voltage is applied to the plurality of first electrodes of the first electrode matrix;
a second voltage is applied to the plurality of second electrodes of the first electrode matrix;
a third voltage is applied to the plurality of third electrodes of the second electrode matrix; and
a fourth voltage is applied to the plurality of fourth electrodes of the second electrode matrix.

15. The liquid crystal lens of claim 14, wherein the first voltage is the same as one of the third and fourth voltages, and the second voltage is same as the other of the third and fourth voltages, and wherein the third and fourth voltages are zero or substantially different from one another.

16. The liquid crystal lens of claim 14, wherein each of the first, second, third and fourth voltages is a DC voltage or an AC voltage.

17. The liquid crystal lens of claim 1, wherein the first substrate and the second substrate have a long edge, and wherein the first transversal direction is in parallel with the long edge or in an inclined angle with the long edge.

18. A display device operably switchable between a two-dimensional (2D) display mode and a three-dimensional (3D) display mode, comprising:
a display panel; and
a liquid crystal lens disposed on the display panel, comprising:
a first substrate and a second substrate spaced apart from each other;
a liquid crystal layer disposed between the first substrate and the second substrate;
a plurality of first electrode structures, each first electrode structure comprising a plurality of first electrodes, a plurality of second electrodes, a plurality of third electrodes and a plurality of fourth electrodes, wherein the plurality of first electrodes and the plurality of second electrodes are disposed between the first substrate and the liquid crystal layer and spaced-apart and alternately arranged along a first transversal direction, and wherein the plurality of third electrodes and the plurality of fourth electrodes are disposed between the second substrate and the liquid crystal layer and spaced-apart and alternately arranged along the first transversal direction such that each of the first electrodes and the second electrodes and a corresponding one of the third electrodes and the fourth electrodes of each first electrode structure are aligned at a left tilted angle; and
a plurality of second electrode structures, each second electrode structure comprising a plurality of first electrodes, a plurality of second electrodes, a plurality of third electrodes and a plurality of fourth electrodes, wherein the plurality of first electrodes and the plurality of second electrodes are disposed between the first substrate and the liquid crystal layer and spaced-apart and alternately arranged along the first transversal direction, and wherein the plurality of third electrodes and the plurality of fourth electrodes are disposed between the second substrate and the liquid crystal layer and spaced-apart and alternately arranged along the first transversal direction such that each of the first electrodes and the second electrodes and a corresponding one of the third electrodes and the fourth electrodes of each second electrode structure are aligned at a right tilted angle, wherein the plurality of first electrode structures and the plurality of second electrode structures are alternately arranged along a second transversal direction that is different from the first transversal direction, wherein each of the first and second transversal directions is parallel to the first and second substrates.

19. The display device of claim 18, wherein the display panel comprises a liquid crystal display panel, an organic light emitting display panel, an inorganic light emitting display panel, an electro-wetting display panel, a field emission display panel, or a plasma display panel.

20. The display device of claim 18, wherein the display panel comprises a plurality of pixels arranged in an array, and wherein the first electrode structures are disposed corresponding to odd rows of the pixel array and the second electrode structures are disposed corresponding to even rows of the pixel array, or vice versus.

21. The display device of claim 18, further comprising a power supply for respectively providing
   a first voltage to the first electrodes of the first electrode structures and the second electrode structures;
   a second voltage to the second electrodes of the first electrode structures and the first electrode structures;
   a third voltage to the third electrodes of the first electrode structures and the second electrode structure; and
   a fourth voltage to the fourth electrodes of the first electrode structures and the second electrode structure.

22. The display device of claim 21, operating in the 2D display mode when the first, second, third and fourth voltages are zero.

23. The display device of claim 22, operating in the 3D display mode when the first voltage is the same as one of the third and fourth voltages, and the second voltage is same as the other of the third and fourth voltages, and wherein the third and fourth voltages are substantially different from one another.

24. The display device of claim 18, wherein the plurality of first electrodes and the plurality of second electrodes of each first electrode structure and each second electrode structure are disposed on a surface of the first substrate facing the liquid crystal layer to form a first single electrode layer thereon, and the plurality of third electrodes and the plurality of fourth electrodes of each first electrode structure and each second electrode structure are disposed on a surface of the second substrate facing the liquid crystal layer to form a second single electrode layer thereon.

* * * * *